(12) United States Patent
Silvernail et al.

(10) Patent No.: US 9,604,405 B2
(45) Date of Patent: Mar. 28, 2017

(54) PIPE FUSION DATA MANAGEMENT SYSTEM AND METHOD

(75) Inventors: David Silvernail, San Diego, CA (US);
Eric C. Davis, Poway, CA (US);
Patrick Smith, San Marcos, CA (US);
Bruce Schurter, San Marcos, CA (US);
James Ledger, San Diego, CA (US)

(73) Assignee: Underground Solutions Technologies Group, Inc., Poway, CA (US)

(*) Notice: Subject to any disclaimer, the term of this patent is extended or adjusted under 35 U.S.C. 154(b) by 331 days.

(21) Appl. No.: 13/086,837

(22) Filed: Apr. 14, 2011

(65) Prior Publication Data

US 2012/0265353 A1 Oct. 18, 2012

(51) Int. Cl.
*G05D 7/00* (2006.01)
*B29C 65/00* (2006.01)
*F16L 47/02* (2006.01)
*F16L 55/165* (2006.01)
*B29C 65/20* (2006.01)

(52) U.S. Cl.
CPC ...... *B29C 66/9674* (2013.01); *B29C 65/2015* (2013.01); *B29C 66/5221* (2013.01); *B29C 66/91231* (2013.01); *B29C 66/91921* (2013.01); *B29C 66/922* (2013.01); *B29C 66/929* (2013.01); *B29C 66/949* (2013.01); *B29C 66/959* (2013.01); *B29C 66/9672* (2013.01); *F16L 47/02* (2013.01); *F16L 55/1652* (2013.01); *B29C 66/71* (2013.01); *B29C 66/9121* (2013.01); *B29C 66/9141* (2013.01); *B29C 66/9161* (2013.01); *B29C 66/91216* (2013.01); *B29C 66/91221* (2013.01)

(58) Field of Classification Search
CPC ... B29C 66/922; B29C 66/924; B29C 66/959; B29C 66/9674
See application file for complete search history.

(56) References Cited

U.S. PATENT DOCUMENTS

| 4,717,805 | A | * | 1/1988 | Miyagawa | 219/108 |
| 5,013,376 | A | * | 5/1991 | McElroy, II | B29C 65/7802 |
| | | | | | 156/358 |
| 5,464,496 | A | * | 11/1995 | Wilson | B29C 66/1142 |
| | | | | | 156/499 |
| 5,788,789 | A | * | 8/1998 | Cooper | B23K 13/025 |
| | | | | | 156/304.2 |
| 5,788,790 | A | * | 8/1998 | Andrew | B29C 65/2092 |
| | | | | | 156/304.2 |
| 5,794,662 | A | | 8/1998 | St. Onge et al. | |

(Continued)

FOREIGN PATENT DOCUMENTS

WO 2010033282 A2 3/2010

*Primary Examiner* — Ryan Jarrett
(74) *Attorney, Agent, or Firm* — Senniger Powers LLP

(57) ABSTRACT

A pipe fusion data management system, including: a data receiving interface for receiving data directly or indirectly from at least one remote source, the data including at least one data field representing at least one of the following: fusion data, pipe data, parameter data, operation data, configuration data, condition data, measurement data, entity data, user data, or any combination thereof; an input for facilitating user input; a storage device for storing received and/or input data; and a processor for generating a visual user interface to display received, input, stored, and/or processed data relating to the fusion, joining and/or installation process.

8 Claims, 42 Drawing Sheets

(56) References Cited

U.S. PATENT DOCUMENTS

| | | | |
|---|---|---|---|
| 5,814,182 A * | 9/1998 | McElroy, II | B29C 65/2084 156/304.2 |
| 5,888,331 A * | 3/1999 | Greig | B29C 63/0069 156/187 |
| 5,948,189 A * | 9/1999 | Parish, II | B29C 65/2084 156/304.2 |
| 6,982,051 B2 | 1/2006 | St. Onge et al. | |
| 7,269,520 B2 | 9/2007 | Marti et al. | |
| 2004/0006437 A1 | 1/2004 | Lam et al. | |
| 2004/0212510 A1 | 10/2004 | Aronstam | |
| 2006/0071365 A1 | 4/2006 | St. Onge et al. | |
| 2007/0056746 A1* | 3/2007 | Newman | 166/383 |
| 2007/0142960 A1* | 6/2007 | Bollinger | A61M 39/146 700/212 |
| 2008/0078811 A1* | 4/2008 | Hillen et al. | 228/101 |
| 2009/0056467 A1* | 3/2009 | Newman | 73/788 |
| 2009/0217788 A1* | 9/2009 | Hunter | 81/57.33 |
| 2010/0174508 A1 | 7/2010 | Trowbridge, Jr. et al. | |
| 2012/0230363 A1* | 9/2012 | Ott | B29C 66/73921 374/21 |

\* cited by examiner

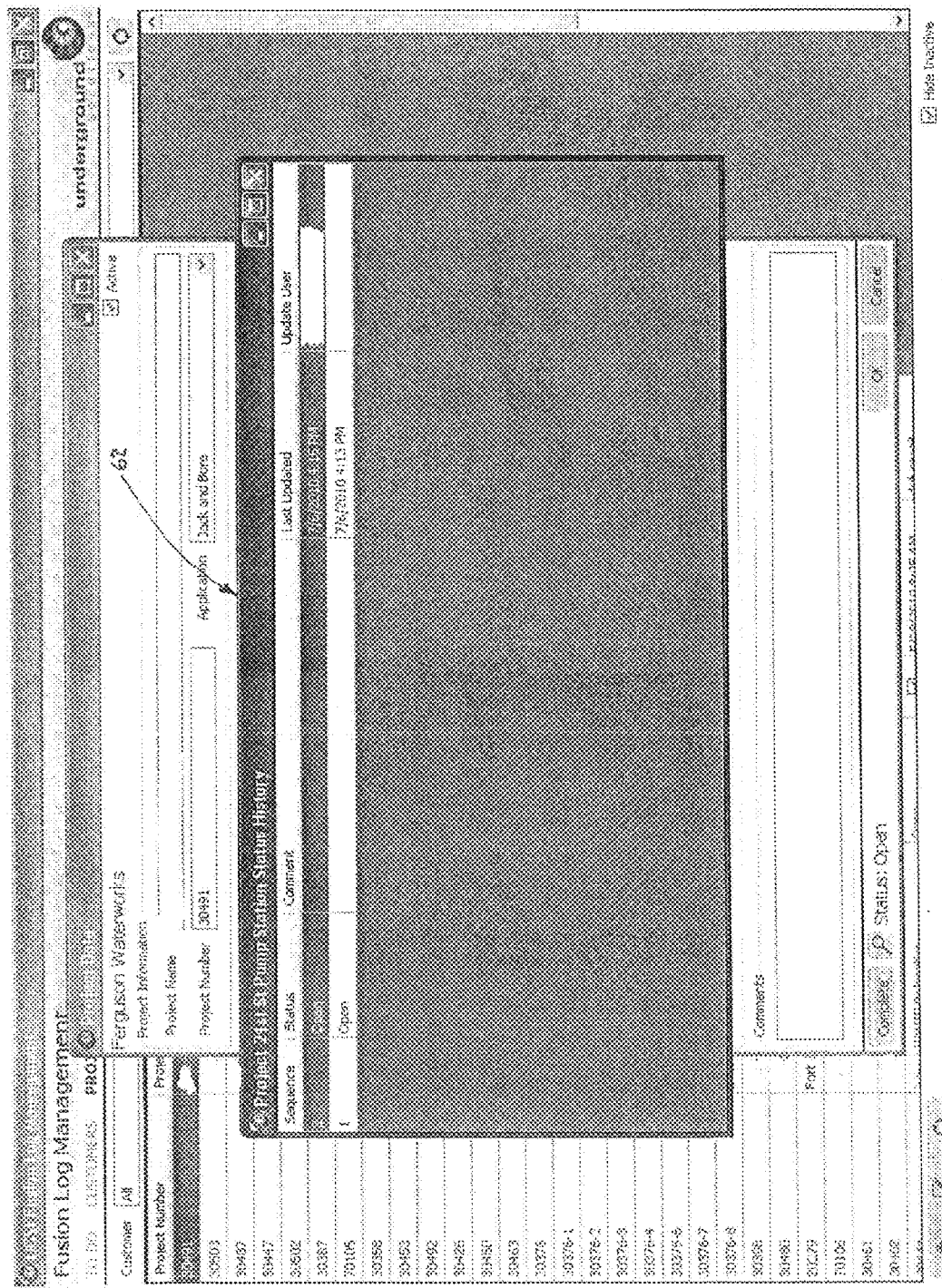

Fig. 6.

Fusion Log Management

SQL Server Reporting Services
Home > Fusion Log Reports > FDMReport

New Subscription

Start of Date Range : 7/19/2010    End of Date Range : 7/20/2010    View Report

| pull number | joint number | joint | fusion date | fusion tech fname | fusion tech lname | DR | pipe diameter | inside diameter | outside diameter | p |
|---|---|---|---|---|---|---|---|---|---|---|
| 14 | 392 | 14393 | 7/19/2010 12:00:00 AM | Terry | | DR 21 DIPS | 14.000000 | 13.840000 | 15.300000 | Gre |
| 14 | 366 | 14386 | 7/19/2010 12:00:00 AM | Terry | | DR 21 DIPS | 14.000000 | 13.840000 | 15.300000 | Gre |
| 2 | 43 | 02044 | 7/19/2010 12:00:00 AM | Eric | | DR 18 DIPS | 20.000000 | 19.200000 | 21.600000 | Whi |
| 4 | 25 | 04025 | 7/20/2010 12:00:00 AM | Michael | | DR 18 DIPS | 20.000000 | 19.200000 | 21.600000 | Gre |
| 14 | 366 | 14386 | 7/19/2010 12:00:00 AM | Terry | | DR 21 DIPS | 14.000000 | 13.840000 | 15.300000 | Gre |
| 14 | 393 | 14380 | 7/19/2010 12:00:00 AM | Terry | | DR 21 DIPS | 14.000000 | 13.840000 | 15.300000 | Gre |
| 2 | 43 | 02043 | 7/19/2010 12:00:00 AM | Eric | | DR 18 DIPS | 20.000000 | 19.200000 | 21.600000 | Whi |
| 14 | 365 | 14385 | 7/19/2010 | Terry | | DR 21 DIPS | 14.000000 | 13.840000 | 15.300000 | Gre |

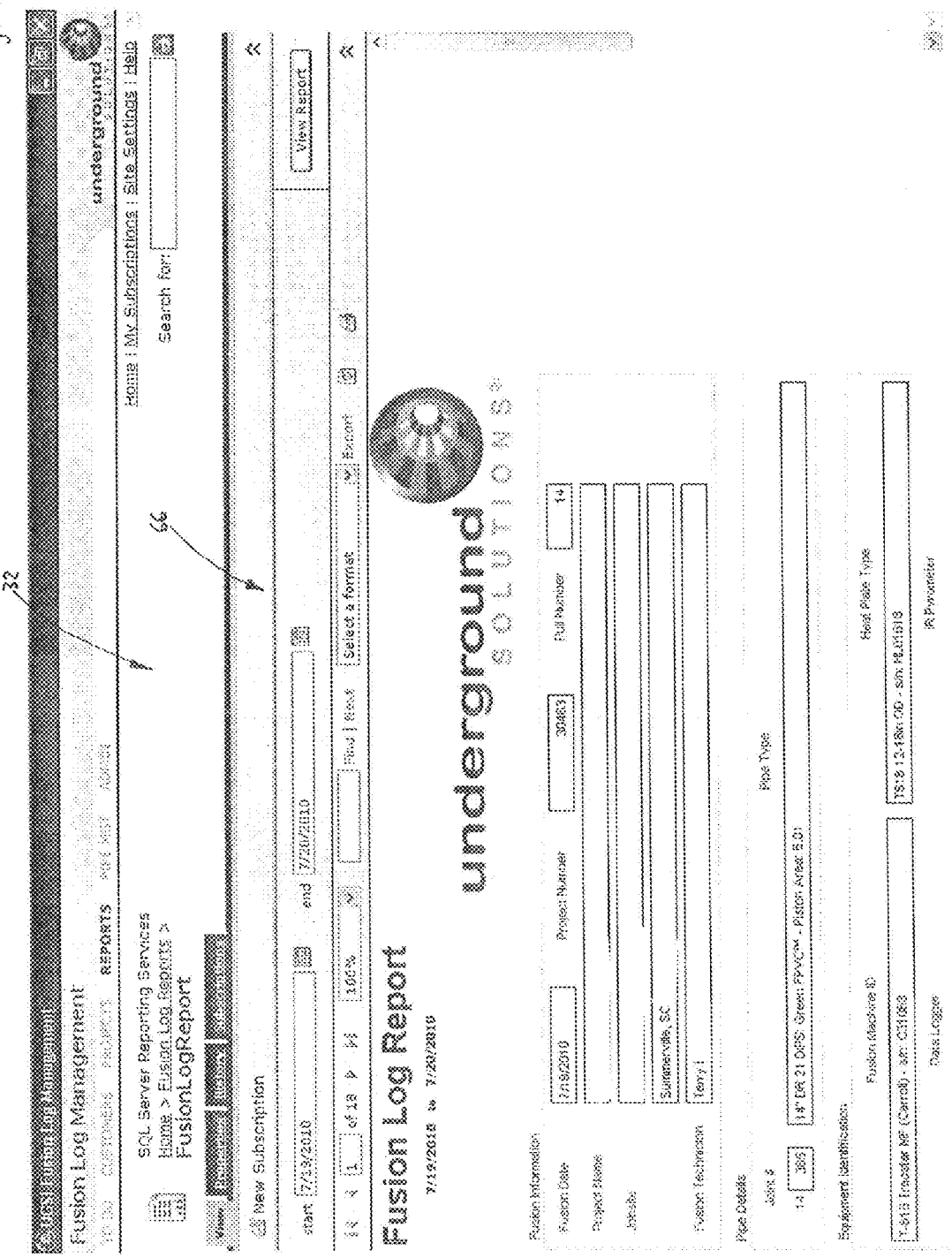

Fusion Log Report
7/19/2010 to 7/20/2010

Fusion Information

| Fusion Date | 7/19/2010 | Project Number | 30463 | Roll Number | 14 |

Project Name:

Jobsite: Summerville, SC 2

Fusion Technician: Terry

Pipe Details

| Joint # | Pipe Type |
| 14 / 385 | 14" DR 21 DIPS Green FPVC™ - Piston Area: 6.01 |

Equipment Identification

| Fusion Machine ID | Heat Plate Type |
| T-618 Tracstar MF (Carroll) - s/n: C31683 | T618 12-18in OD - s/n: HL01818 |

| Data Logger | IR Pyrometer |
| MDL3-0480 | 63 Mini IR with Hard Case - s/n: 9391-1736 |

(A) Pressures (psi) | (B) Ambient Conditions / Start Time

| Drag | 95 | Ambient Outside Temperature (°F) | 80 | Ambient Pipe Temperature (°F) | 78 |
| Heat | 217 | Start / End Time | 08:48 / 09:31 | Pipe Temp at End (°F) | 98 |
| Fusion | 872 | Heating Time | 2 min 30 sec | Weather | Sunny |

(C) Heating Plate Temperature & Extrusion Marking

Left Face Temperature (°F)   Right Face Temperature (°F)

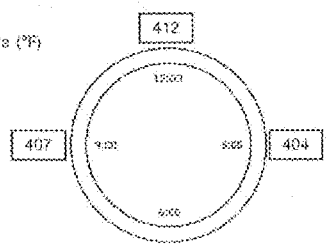
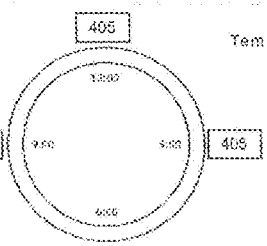

Joint Number: 14085

| | 404 | 4/13/2010 | 02:50 | 404 | 4/13/2010 | 03:45 |

☐ Intermediate Fusion

◄— 40 —► ◄— 40 —►

(D) Site Conditions

Tuesday 7/20/2010 11:02:39 AM

Production Report
7/19/2010 to 7/20/2010

| Field | Value |
|---|---|
| Job Number : | 30463, 30492, 30496 |
| Pipe Size : | 14", 20" |
| Pipe Rating : | DR 18 DIPS, DR 21 DIPS |
| Pipe Color : | Green, White |
| Technician : | |
| Machine : | T-618 TracStar MF (Carroll), T-900 TracStar MF |

| | |
|---|---:|
| (illegible) | 2 |
| (illegible) | 18 |
| (illegible) | 9 |
| (illegible) | -2995 |
| (illegible) | 0:55 |
| (illegible) | 1:18 |

Tuesday 7/20/2010 11:03:07 AM

Fig. 20

Fusion Log Management underground SOLUTIONS

*Configurations*

| ID | Freight Rate | Labor Rate | Hotel Rate | Per Diem | Consumables | Company Vehicle | Margin | Miscellaneous | Min Freight Charge | Markup |
|---|---|---|---|---|---|---|---|---|---|---|
| Edit 1 | | | | | | | | | | |

Home

Fig. 21

Pipe Diameters

| | Pipe Diameter ID | Diameter |
|---|---|---|
| Edit | 4 | 4.000000 |
| Edit | 6 | 6.000000 |
| Edit | 9 | 8.000000 |
| Edit | 10 | 10.000000 |
| Edit | 12 | 12.000000 |
| Edit | 14 | 14.000000 |
| Edit | 16 | 16.000000 |
| Edit | 29 | 18.000000 |
| Edit | 30 | 20.000000 |
| Edit | 31 | 24.000000 |
| Edit | 32 | 30.000000 |
| Edit | 33 | 36.000000 |
| Edit | 34 | 27.000000 |
| Edit | 35 | 15.000000 |
| Edit | 36 | 21.000000 |
| Edit | 37 | 42.000000 |

New Pipe Diameter

Home

Fusion Log Management underground SOLUTIONS

Pipe Specifications

Select Pipe Class: DR 26 HPS

| | Pipe Diameter | Minimum Length | Maximum Length | Outside Diameter (in) | Wall Thickness (in) | Safe Pull Force (lbs) |
|---|---|---|---|---|---|---|
| Edit | 4.00 | 18240 | 18240 | 4.50 | 0.000 | 6400.00 |
| Edit | 6.00 | 8320 | 8320 | 0.00 | 0.000 | 0.00 |
| Edit | 8.00 | 4480 | 4480 | 0.00 | 0.000 | 0.00 |
| Edit | 10.00 | 2880 | 2880 | 0.00 | 0.000 | 0.00 |
| Edit | 12.00 | 2240 | 2240 | 0.00 | 0.000 | 0.00 |
| Edit | 14.00 | 1440 | 1440 | 0.00 | 0.000 | 0.00 |
| Edit | 16.00 | 1280 | 1280 | 0.00 | 0.000 | 0.00 |
| Edit | 18.00 | | | 0.00 | 0.000 | 0.00 |
| Edit | 20.00 | | | 0.00 | 0.000 | 0.00 |
| Edit | 24.00 | | | 0.00 | 0.000 | 0.00 |
| Edit | 30.00 | | | 0.00 | 0.000 | 0.00 |
| Edit | 36.00 | | | 0.00 | 0.000 | 0.00 |
| Edit | 27.00 | | | 0.00 | 0.000 | 0.00 |
| Edit | 15.00 | | | 0.00 | 0.000 | 0.00 |
| Edit | 21.00 | | | 0.00 | 0.000 | 0.00 |
| Edit | 42.00 | | | 0.00 | 0.000 | 0.00 |

PIPE FUSION DATA MANAGEMENT SYSTEM AND METHOD

BACKGROUND OF THE INVENTION

Field of the Invention

The present invention relates generally to data management systems and methods, and in particular to a pipe fusion data management system and method for use in connection with a system and arrangement for fusing two or more sections of pipe or conduit for use in a variety of applications.

Description of the Related Art

Conduit systems are used in many applications throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping is both unsightly and intrusive. Furthermore, conduit systems and arrangements can be used in non-fluid applications, such as for providing protected conduit systems through which wire, cable, and the like can be positioned.

In general, water conduit systems transport material through piping manufactured from various materials, e.g., cast iron, ductile iron, reinforced concrete, cement-asbestos, etc. The pipes are buried underground, with the branches extending in various directions in order to reach the end user. Normally, after many years of use, or for some other reason, the in-ground piping fails and begins to leak, thereby reducing line pressure and unnecessarily allowing water to leak into the area surrounding the piping. Such leaks not only affect the system, but also increase the processing costs of the supplier, which, in turn, increases the end user costs. Therefore, these leaks must be quickly repaired and preventative measures taken to ensure that further leakage is prevented. In order to address such issues and provide an effective solution to these leaking pipe systems, a pipe liner and method of installation have been developed, as disclosed in U.S. Pat. No. 5,794,662, which is incorporated herein by reference, and which is primarily directed to pressurized pipeline applications. The '662 patent relates to the expansion of a pipe within a host pipe that requires repair.

While the '662 patent represents an advance in the art of relining or repairing underground conduit systems, there is room in the art for additional improvements and advancements. For example, in order to transport and insert the liner conduit within the host conduit, the liner conduit must be manufactured in sections or portions, which are typically much shorter in length than the final and intended liner conduit length. Therefore, portions of the liner conduit must be connected onsite as the liner conduit is fed into the host conduit. In addition, there is a need for the ability to connect multiple lengths of the liner conduit via a joint having substantially the same strength or pressure capability as that of the original conduit, and which does not increase the diameter of the joint area beyond the original conduit diameter.

Still further, the use of multiple and connectable pipe or conduit pieces is useful in many different applications beyond the above-discussed expansion application. For example, the use of such fused pipe is particularly useful in the case of slip-lining, wherein a slightly smaller diameter fused conduit is inserted into a larger pipe that is in need of rehabilitation, but that does not require a full capacity for flow. In this case, the conduit is pulled in and left in place, but is not expanded. In most cases, the space between the conduit and the host pipe is filled with a low-strength grout to hold the new line in position Fused conduit is also required in various other applications, such as in a rehabilitation application, or in a horizontal directional drilling process. This method drills a pilot hole in the ground in a precise manner to control elevation and alignment. After the pilot hole is complete, the drill hole is reamed to a larger diameter and filled with drill mud to hold the larger hole open. The drill casing is then pulled through the drill mud resulting in a conduit in place. Further, fused conduit is useful in a pipe bursting application. Pipe bursting uses a large hydraulic or pneumatic cutter head to break apart old pipe and force the pieces into the surrounding soil. This allows a new pipe of equal or larger diameter in the existing line to be pulled in. This process is used where the replacement line capacity must be maintained or increased. Also, of course, fused pipe is equally useful in a direct-bury application, or in conduit systems used to convey wire, cable, and the like.

Fusion processes for pipe or conduit have been developed that utilize mechanical joints, embedded wires at or near the fusion joint or resistive heating elements for joining conduit sections together. Accordingly, preexisting fusion equipment is available. However, this equipment must be modified in its use and operating parameters for fusion of polyvinyl chloride-based conduit. While pipe made from PVC is widely used in connection with potable water and wastewater systems, these piping systems are created by joining sections of PVC pipe by bell-and-spigot gasket arrangements or solvent-cement joints. There exist certain ASTM International (ASTM) Standard Specifications and American Water Works Association (AWWA) specifications that address such products/systems.

Unlike PE pipe, which is generally joined by heat fusion techniques, PVC pipe has normally been limited to applications that can be serviced by bell-and-spigot joints. This limitation has restricted the use of PVC pipe in various rehabilitation and new-build applications. In order to address these and other issues, a fusion process for conduit has been developed, as shown and described in U.S. Pat. No. 6,982,051 and Publication No. 2006/0071365 (application Ser. No. 11/244,123), both of which are incorporated herein by reference.

At zero expansion, the Hydrostatic Design Basis (HDB) of the PVC conduit is known to be about 4,000 psi. At two times expansion, the HDB of the PVC conduit is about 7,100 psi. However, definitively determining the HDB of expanded PVC conduit at any value between these values may be useful, and indeed, in some instances, required. Further, as a result of field conditions, the variance in wall thickness of the PVC starting stock, when expanded, reduces the data confidence level to less than the required 85% when conventional technology is used. Accordingly, and in order to address the need for a methodology that yields results within the required confidence level and provide data between known points, methods and systems have been developed to effectively determine the Hydrostatic Design Basis (HDB) of expanded oriented pipe other than at specific predetermined uniform expansion. Such methods and systems are shown and described in U.S. Pat. No. 7,269,520, which is incorporated herein by reference.

Based upon the above discussion, it is clear that fusion of pipe (whether made from PVC or PE) is a data-centric process. As most piping systems are large and complex, when using fusion to join sections of pipe, a large number of fused joints are created. Therefore, there is a need to obtain, store, process, and analyze some or all of the data associated with the fusion process in a centralized system. For example, the fusion process should be controlled and managed at all stages to help ensure effective and safe preparation, fusion, and installation. Still further, multiple fusion processes may be occurring in multiple projects and locations during the same time period. Such a large number of fusion and installation processes leads to a large data set, which, if properly collected and analyzed, allows for effective and accurate control.

Therefore, there is a need in the art for a pipe fusion data management system that collects, stores, processes, and/or analyzes the multiple and remote fusion and installation processes occurring in various, discrete locations.

SUMMARY OF THE INVENTION

Generally, the present invention provides a pipe fusion data management system that enables users to overcome or address some or all of the deficiencies and drawbacks existing in the collection, transmission, and analysis of data from known fusion applications and processes. Preferably, the present invention provides a pipe fusion data management system that facilitates the collection, storage, processing, and/or analysis of many different data points, streams, and information pertaining to the fusion and/or installation of pipe, whether in a reparation, construction, or new installation application. Preferably, the present invention provides a pipe fusion data management system that leads to the effective management and control of multiple and remote fusion processes occurring in the various locations.

Therefore, in one preferred and non-limiting embodiment of the present invention, provided is a pipe fusion data management system. The system includes a data receiving interface configured to receive data directly or indirectly from at least one remote source, the data including at least one data field representing at least one of the following: fusion data, pipe data, parameter data, operation data, configuration data, condition data, measurement data, entity data, user data, or any combination thereof; an input device configured to facilitate user input of data; a storage device in direct or indirect communication with at least one of the data receiving interface and the input device and configured to store at least one of the following: at least a portion of the data received at the data receiving interface, at least a portion of the data input by a user, processed data, or any combination thereof; and a processor in direct or indirect communication with at least one of the data receiving interface, the input device, and the storage device, the processor configured to generate a visual user interface configured to display at least one of the following: at least a portion of the data received at the data receiving interface, at least a portion of the data input by the user; at least a portion of the data stored on the storage device, processed data, or any combination thereof.

In another preferred and non-limiting embodiment of the present invention, provided is a computer-implemented method for pipe fusion data management. The method is implemented on at least one computer having a computer readable medium having stored thereon instructions, which, when executed by a processor of the computer, causes the processor to: (i) receive data directly or indirectly from at least one remote source, the data including at least one data field representing at least one of the following: fusion data, pipe data, parameter data, operation data, configuration data, condition data, measurement data, entity data, user data, or any combination thereof; and (ii) generate a visual user interface configured to display at least one of the following: at least a portion of the data received from the at least one remote source, at least a portion of data input by a user, at least a portion of data stored on a storage device, processed data, or any combination thereof, the user interface comprising at least one of the following: a central interface, an activity interface, a customer interface, a project interface, a report interface, a pipe management interface, an administration interface, or any combination thereof. The at least one remote source comprises at least one pipe fusion arrangement including at least one fusion apparatus configured to fuse a plurality of pipe sections together, thereby creating at least one fusion joint.

In a further preferred and non-limiting embodiment of the present invention, provided is a pipe fusion data management system, including: means for receiving data directly or indirectly from at least one remote source, the data including at least one data field representing at least one of the following: fusion data, pipe data, parameter data, operation data, configuration data, condition data, measurement data, entity data, user data, or any combination thereof; and means for generating a visual user interface configured to display at least one of the following: at least a portion of the data received from the at least one remote source, at least a portion of data input by a user, at least a portion of data stored on a storage device, processed data, or any combination thereof, the user interface comprising at least one of the following: a central interface, an activity interface, a customer interface, a project interface, a report interface, a pipe management interface, an administration interface, or any combination thereof. The at least one remote source comprises at least one pipe fusion arrangement including at least one fusion apparatus configured to fuse a plurality of pipe sections together, thereby creating at least one fusion joint.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIGS. 3-11 are exemplary screenshots of functional aspects of one embodiment of a pipe fusion data management system according to the principles of the present invention;

FIGS. 12-18 are exemplary screenshots and reports created by one embodiment of a pipe fusion data management system according to the principles of the present invention; and FIGS. 19-42 are exemplary screenshots of functional aspects of one embodiment of a pipe fusion data management system according to the principles of the present invention.

DETAILED DESCRIPTION OF THE PREFERRED EMBODIMENT(S)

Figure 1:
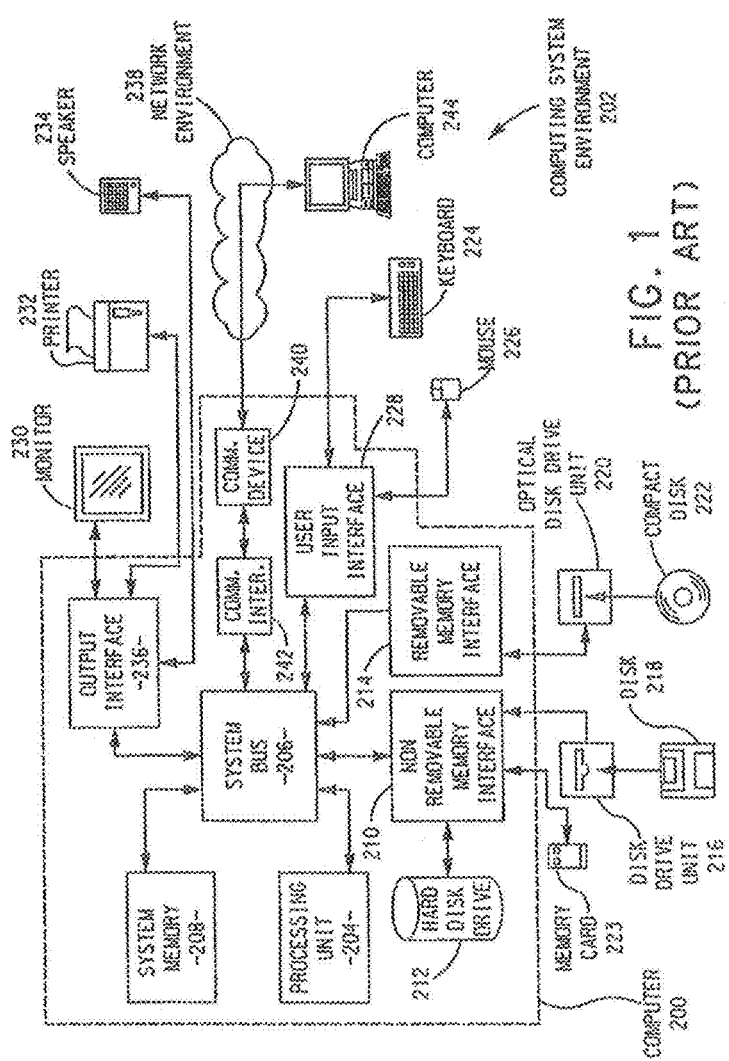
FIG. 1 is a schematic view of a computing system and environment according to the prior art.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

It is to be understood that the invention may assume various alternative variations and step sequences, except where expressly specified to the contrary. It is also to be understood that the specific devices illustrated in the attached drawings, and described in the following specification, are simply exemplary embodiments of the invention.

The present invention may be implemented on a variety of computing devices and systems, wherein these computing devices include the appropriate processing mechanisms and computer-readable media for storing and executing computer-readable instructions, such as programming instructions, code, and the like. As illustrated in FIG. 1 and according to the prior art, a schematic and block diagram of exemplary computing devices, in the form of personal computers 200, 244, in a computing system environment 202 are provided. This computing system environment 202 may include, but is not limited to, at least one computer 200 having certain components for appropriate operation, execution of code, and creation and communication of data. For example, the computer 200 includes a processing unit 204 (typically referred to as a central processing unit or CPU) that serves to execute computer-based instructions received in the appropriate data form and format. Further, this processing unit 204 may be in the form of multiple processors executing code in series, in parallel, or in any other manner for appropriate implementation of the computer-based instructions.

In order to facilitate appropriate data communication and processing information between the various components of the computer 200, a system bus 206 is utilized. The system bus 206 may be any of several types of bus structures, including a memory bus or memory controller, a peripheral bus, or a local bus using any of a variety of bus architectures. In particular, the system bus 206 facilitates data and information communication between the various components (whether internal or external to the computer 200) through a variety of interfaces, as discussed hereinafter.

The computer 200 may include a variety of discrete computer-readable media components. For example, this computer-readable media may include any media that can be accessed by the computer 200, such as volatile media, non-volatile media, removable media, non-removable media, etc. As a further example, this computer-readable media may include computer storage media, such as media implemented in any method or technology for storage of information such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 200. Further, this computer-readable media may include communications media, such as computer-readable instructions, data structures, program modules, or other data in a modulated data signal such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, Bluetooth or any acceptable wireless communication format or technology, etc.). Of course, combinations of any of the above should also be included within the scope of computer-readable media.

The computer 200 further includes a system memory 208 with computer storage media in the form of volatile and non-volatile memory, such as ROM and RAM. A basic input/output system (BIOS) with appropriate computer-based routines assists in transferring information between components within the computer 200 and is normally stored in ROM. The RAM portion of the system memory 208 typically contains data and program modules that are immediately accessible to or presently being operated on by processing unit 204, e.g., an operating system, application programming interfaces, application programs, program modules, program data, and other instruction-based computer-readable code.

The computer 200 may also include other removable or non-removable, volatile or non-volatile computer storage media products. For example, the computer 200 may include a non-removable memory interface 210 that communicates with and controls a hard disk drive 212, i.e., a non-removable, non-volatile magnetic medium; and a removable, non-volatile memory interface 214 that communicates with and controls a magnetic disk drive unit 216 (which reads from and writes to a removable, non-volatile magnetic disk 218), an optical disk drive unit 220 (which reads from and writes to a removable, non-volatile optical disk, such as a CD ROM 222), a Universal Serial Bus (USB) port for use in connection with a removable memory card 223, etc. However, it is envisioned that other removable or non-removable, volatile or non-volatile computer storage media can be used in the exemplary computing system environment 202, including, but not limited to, magnetic tape cassettes, DVDs, digital video tape, solid state RAM, solid state ROM, etc. These various removable or non-removable, volatile or non-volatile magnetic media are in communication with the processing unit 204 and other components of the computer 200 via the system bus 206. The drives and their associated computer storage media discussed above and illustrated in FIG. 1 provide storage of operating systems, computer-readable instructions, application programs, data structures, program modules, program data, and other instruction-based computer-readable code for the computer 200 (whether duplicative or not of the information and data in the system memory 208).

A user may enter commands, information, and data into the computer 200 through certain attachable or operable input devices, such as a keyboard 224, a mouse 226, etc., via a user input interface 228. Of course, a variety of such input devices may be utilized, e.g., a microphone, a trackball, a joystick, a touchpad, a touch-screen, a scanner, etc., including any arrangement that facilitates the input of data and information to the computer 200 from an outside source. As discussed, these and other input devices are often connected to the processing unit 204 through the user input interface 228 coupled to the system bus 206, but may be connected by other interface and bus structures, such as a parallel port, game port, or a USB. Still further, data and information can be presented or provided to a user in an intelligible form or format through certain output devices, such as a monitor 230 (to visually display this information and data in electronic form), a printer 232 (to physically display this information and data in print form), a speaker 234 (to audibly present this information and data in audible form), etc. All of these devices are in communication with the computer 200 through an output interface 236 coupled to the system bus 206, It is envisioned that any such peripheral output devices be used to provide information and data to the user.

The computer 200 may operate in a network environment 238 through the use of a communications device 240, which is integral to the computer or remote therefrom. This communications device 240 is operable by and in communication with the other components of the computer 200 through a communications interface 242. Using such an arrangement, the computer 200 may connect with or otherwise communicate with one or more remote computers, such as a remote computer 244, which may be a personal computer, a server, a router, a network personal computer, a peer device, or other common network node, and typically includes many or all of the components described above in connection with the computer 200. Using appropriate communications devices 240, e.g., a modem, a network interface, or adapter, etc., the computer 200 may operate within and communicate through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 200, 244 may be used.

As used herein, the computer 200 includes or is operable to execute appropriate custom-designed or conventional software to perform and implement the processing steps of the method and system of the present invention, thereby forming a specialized and particular computing system. Accordingly, the presently-invented method and system may include one or more computers 200 or similar computing devices having a computer-readable storage medium capable of storing computer-readable program code or instructions that cause the processing unit 204 to execute, configure, or otherwise implement the methods, processes, and transformational data manipulations discussed hereinafter in connection with the present invention. Still further, the computer 200 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

The present invention is directed to a pipe fusion data management system 10 for use in connection with a pipe fusion arrangement PFA, which typically includes at least one fusion apparatus FA configured or operable to fuse or join two or more pipe sections together, thereby creating at least one fusion joint. This fusion apparatus FA may be utilized and operated by a trained technician T. Further, and normally, the fusion process, such as the fusion process shown and described in the above-referenced '051 patent and/or '365 publication, occurs at the job site in various, discrete locations (or even various positions or areas at a single, large worksite). In particular, one or more job sites may employ one or multiple fusion apparatuses FA to join pipe sections for use in any of a variety of applications, such as the applications discussed above. In addition, these applications are normally customer-specific, and regardless of how many job sites, project-specific as well. Therefore, when there are multiple projects occurring at these various and remote locations, the pipe fusion arrangement PFA or fusion apparatus FA at each location (or position at the location) is generating a large amount of useful data. It is this data or data source that represents one of the primary focuses of the pipe fusion data management system 10 of the present invention.

It should be noted that the presently-invented pipe fusion data management system 10 is not limited to the fusion (or joining) of any particular type, size, or configuration of pipe. Although, in one preferred and non-limiting embodiment, the pipe fusion process is referring to the fusion of polyvinyl chloride pipe sections, the system 10 is also useful in connection with the fusion and/or joining of other types and sizes of pipes, such as high density polyethylene pipe, polyethylene pipe, polyolefin pipe, thermoplastic pipe, synthetic pipe, metal pipe, or the like. Further, the system 10 of the present invention can be effectively used to manage other fusion or joining processes, such as welding, mechanical joints and arrangements, adhesion, and the like.

Further to the data that is generated and/or collected at the job site or remote location, additional data can be associated therewith, whether on a customer-specific or project-specific basis. Accordingly, the system 10 allows for the appropriate generation, identification, collection, storage, and/or analysis of multiple data streams for use in project management, exception identification and reporting, immediate process improvement, as well as long-term process improvement. Therefore, and in one preferred and non-limiting embodiment, the system 10 represents a central repository and analysis system that can be utilized to effectively track, control, manage, and improve both the individual and collective pipe fusion processes.

In addition, the system 10 can be implemented and operated on one or more computers 200, 244 and/or in a computing system environment 202. Accordingly, the data can be derived or generated (as well as communicated) from any component of the pipe fusion arrangement PFA or fusion apparatus FA in a direct or indirect manner. For example, the fusion apparatus FA may have the appropriate computer 200 or similar computing device capable of receiving and/or transmitting data, or alternatively, the technician T may use an onsite computer 200 to transmit or send this data, normally in a wireless format. However, as discussed hereinafter, any of the components, functions, or features of the presently-invented system 10 can be implemented on one or more computers 200 or computing devices capable of effectively implementing such functions. Therefore, the present invention is not limited to any specific computer 200 or computing system environment 202, such that some or all of the steps, processes, and functions may also be implemented in the network environment 238 (i.e., the "cloud" or software-as-a-service (SaaS) environment).

Figure 2:
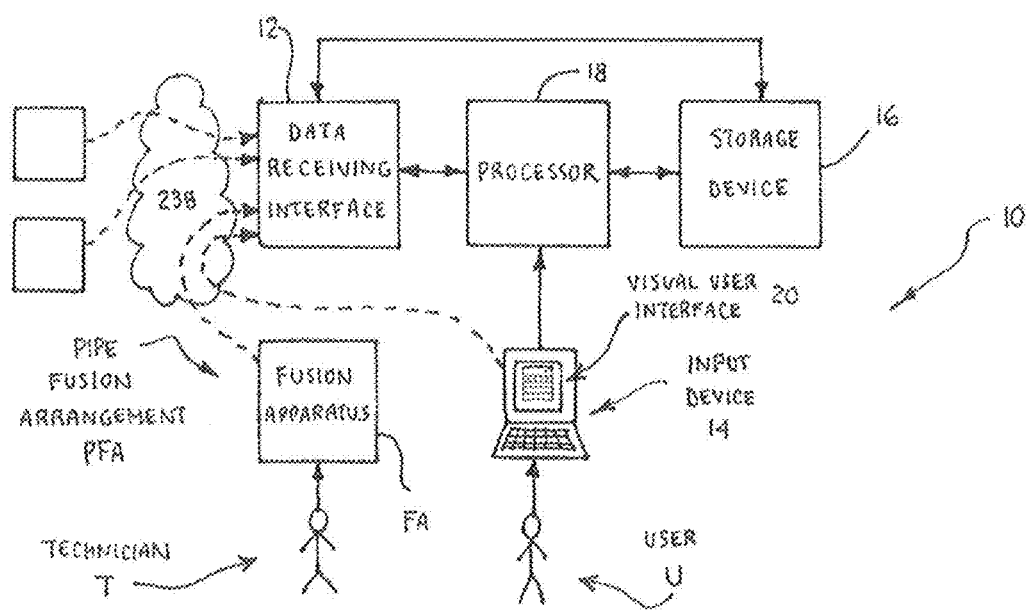
FIG. 2 is a schematic view of one embodiment of a pipe fusion data management system according to the principles of the present invention.

One preferred and non-limiting embodiment of the present invention is illustrated in FIG. 2. In particular, the system 10 includes a data receiving interface 12 that is configured, adapted, or programmed to directly or indirectly receive data from at least one remote source, such as the pipe fusion arrangement PFA, fusion apparatus FA, and/or technician T. Further, this received data includes fusion data, pipe data, parameter data, operation data, configuration data, condition data, measurement data, entity data, and/or user data. The system 10 further includes one or more input devices 14 configured, adapted, or programmed to facilitate the user U input of data. This input device 14 may also be in the form of a computer 200 or computing system environment 202, and may permit the user U to input data in a direct or indirect (wireless) manner. In this embodiment, normally the user U will have certain privileges that are established for use of the various features and functions of the system 10 discussed hereinafter.

The system 10 includes one or more storage devices 16 that are in direct or indirect communication with the data receiving interface 12 and the input device 14, and such storage devices 16 are configured, adapted, or programmed to store at least a portion of the data received from the data receiving interface 12, at least a portion of the data input by the user U, and/or processed data. Further, the system 10 includes a processor 18 that is in direct or indirect communication with the data receiving interface 12, the input device 14, and the storage device 16. The processor 18, normally in the form of some computing device, computer, server, or the like, is configured, adapted, or programmed to generate a visual user interface 20 for displaying at least a portion of the data received at the data receiving interface 12, at least a portion of the data input by the user U, at least a portion of the data stored in the storage device 16, and/or processed data. As discussed above, the system 10 may provide for the generation and/or receipt of data from one or more remote sources, such as the pipe fusion arrangement PFA, the fusion apparatus FA, the technician T, the input device 14, and/or the user U.

Various screenshots of one preferred and non-limiting embodiment of the system 10 of the present invention are set forth in FIGS. 3-11 and 19-42, with exemplary reports configured and created by the system 10 in FIGS. 12-18. However, it should be noted that the layout, format, and other visual features of this exemplary embodiment could be modified or otherwise configured without departing from the spirit and scope of the present invention. For example, the layouts, selectable portions, drop-down menus, radio buttons, and other functional and navigational features could be reconfigured or otherwise modified for use in connection with a variety of computers and interfaces. Further, such features may be user-configurable, such that the visual user interface 20 can be adapted or modified to meet the individual requirements of the user U.

As provided in FIG. 3, the user interface 20 includes an initial or central interface 22, and the central interface 22 includes multiple selectable elements 24 (e.g., buttons, activatable portions, etc.) for navigating to specific portions of the system 10 (as discussed hereinafter). As stated above, this central interface 22 may be formatted or laid out in any desirable manner, and in one preferred and non-limiting embodiment, the central interface 22 includes multiple and discrete selectable elements 24 for navigating to an activity interface 26, a customer interface 28, a project interface 30, a report interface 32, a pipe management interface 34, and an administration interface 36.

As discussed hereinafter, each of these various interfaces 26, 28, 30, 32, 34, 36 represent certain functional portions or sub-systems for facilitating or implementing the overall functionality of the system 10. Therefore, the central interface 22 is in the form of an interactive interface for presenting the user U with multiple options for viewing, arranging, providing, configuring, and/or outputting at least a portion of the data received at the data receiving interface 12, at least a portion of the data input by the user U, at least a portion of the data stored on the storage 16, and/or data processed by the system 10.

Figure 3:
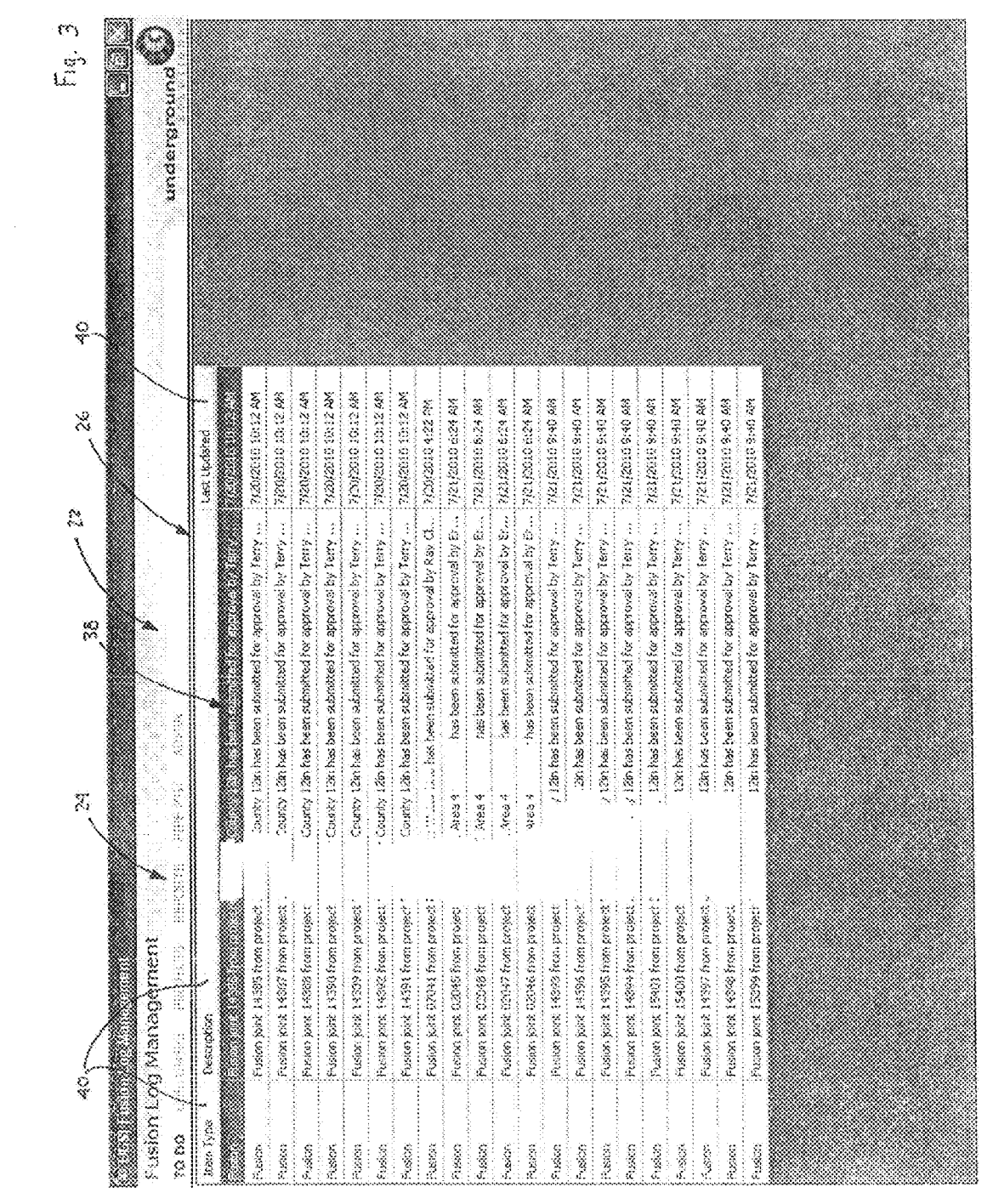

As shown in FIG. 3, and in one preferred and non-limiting embodiment, the activity interface 26 is an interactive interface for viewing, arranging, providing, configuring, and/or outputting activity data 38. In this embodiment, the activity data 38 includes item data, description data, update data, and/or fusion data. The item data is directed to the type of item or entry, such as "fusion" or the like. The description data includes specified fusion data, such as the fusion joint number, project information relating to the fusion joint, the size of the pipe being fused, and the identification of the person submitting the fusion joint for approval. The update data includes when the item, such as the specific fusion joint, was submitted for approval.

In this manner, the user U (or the person who would approve the fusion joint) is able to receive an itemized report on all the fusion joints submitted. Further, by activating a button 40 at the top of a column, the underlying activity data 38 can be reordered based upon the nature of the button 40, such as in alphabetical order, in time order, in type order, in category order, or the like. In addition, the activity interface 26 accepts a user selection of one or more of the items, typically a row of activity data 38, and generates a detailed fusion joint report 42, as illustrated in one preferred and non-limiting embodiment in FIGS. 4 and 5.

Figure 4:
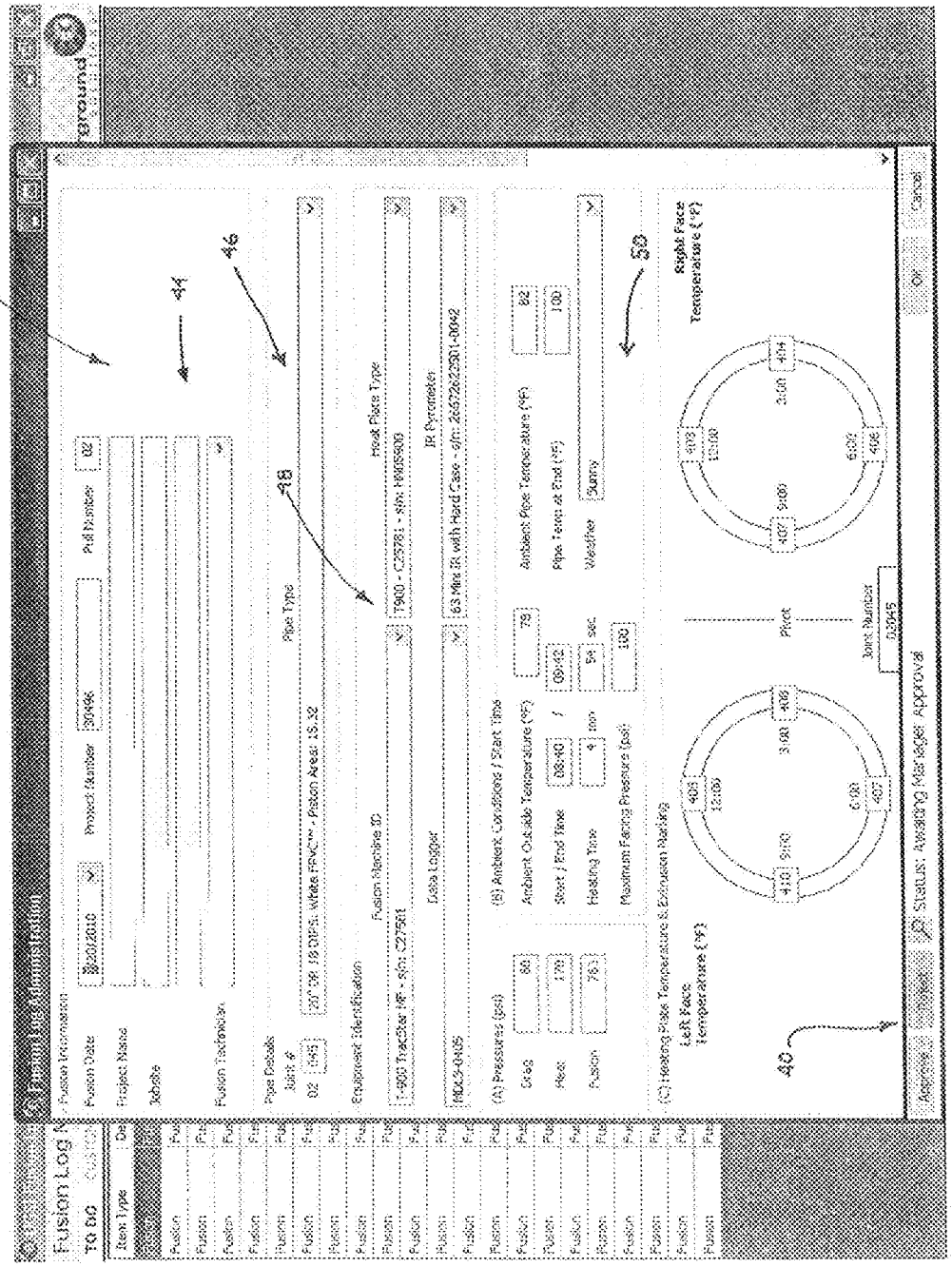
Figure 5:
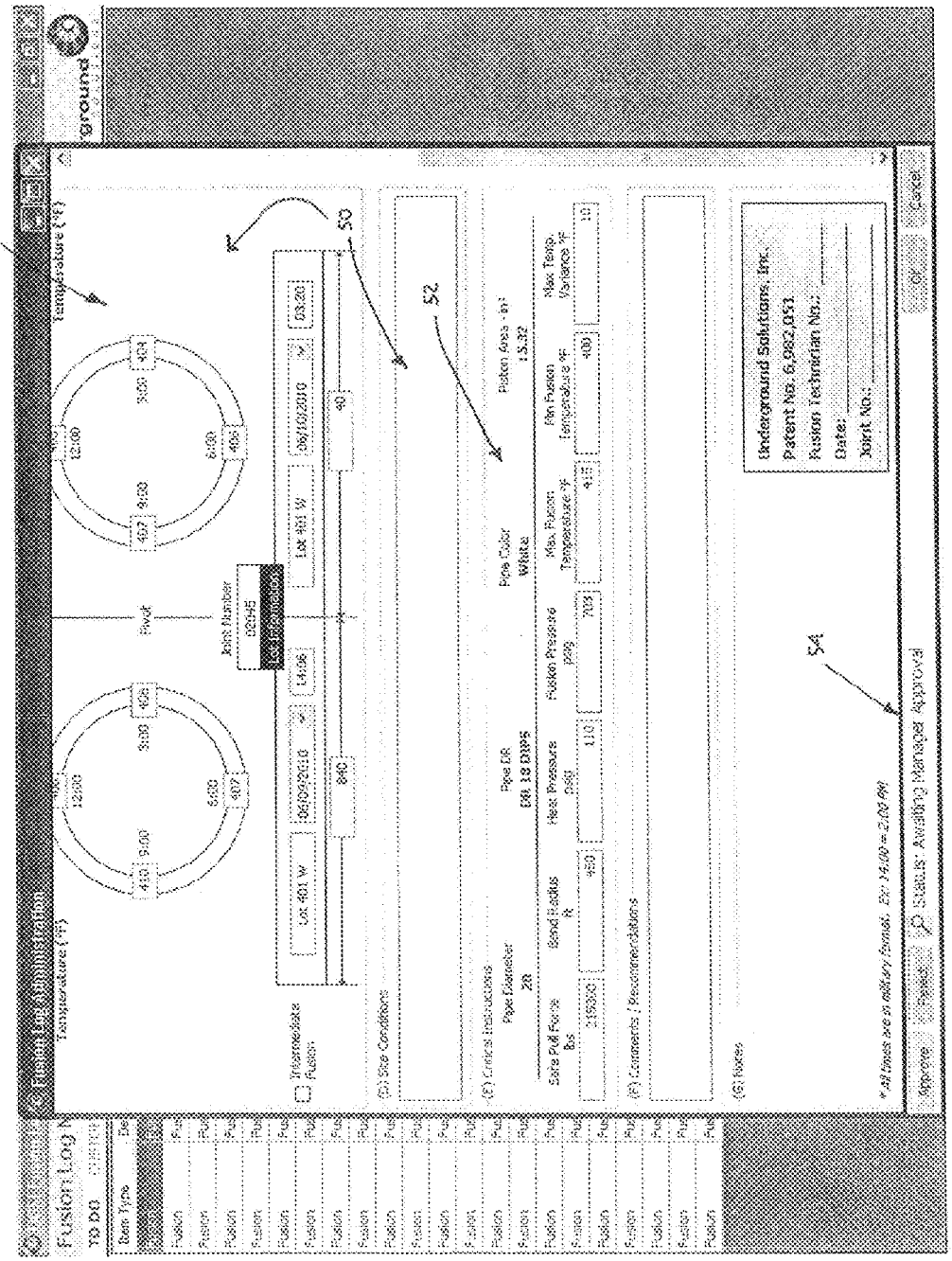

With reference to FIGS. 4 and 5, the fusion joint report 42 is also an interactive interface for viewing, arranging, providing, and/or outputting data for review by the user U and approval of the specific fusion joint. Accordingly, this interactive interface may include and present fusion data 44, pipe data 46, equipment data 48, condition data 50, instruction data 52, and/or status data 54. Further, the fusion joint report 42 allows the user U to review, analyze, and/or modify the information and data presented thereon, such as through direct editing, selectable elements 24, drop-down menus, radio buttons, or the like. After performing this review, the user U may "approve" or "reject" the fusion joint using the buttons 40 at the bottom of the fusion joint report 42. In addition, displayed next to these buttons 40 is status data 54 indicating the status of that particular fusion joint.

As shown in FIG. 4, the fusion data 44 includes the fusion date, the project number, the pull number, the project name, jobsite information, and the fusion technician. While the data in the fusion joint report 42 is initially populated and transmitted by the pipe fusion arrangement PFA, fusion apparatus FA, and/or technician T, the user U (such as a user U with administrative rights) can review, modify, accept, or reject some or all of the information on the fusion joint report 42.

As further illustrated in FIG. 4, the pipe data 46 includes the joint number, and the type of pipe being fused or joined. The equipment data 48 includes the identification of the fusion machine, the type of heat plate used, the type and serial number of the data logger used, the type and serial number of the pyrometer used, and other equipment information. It should be noted that by tracking this type of detail and information with respect to each fusion joint, the system 10 facilitates further analysis and accurate determination of any failure points or other required maintenance issues. For example, if a specific heat plate or fusion machine is resulting in certain variations over multiple fusion joints, this machine or heat plate can be identified and targeted for maintenance and/or other corrective actions. Accordingly, the system 10 of the present invention allows for the accurate analysis and determination across all aspects of the fusion or joining process.

The condition data 50 includes pressure information, including drag pressure, heat pressure, and fusion pressure, as well as the ambient conditions and time information, such as ambient outside temperature, ambient pipe temperature, starting time, ending time, pipe temperature at the end of the process, heating time, maximum facing pressure, and the type of weather during the fusing operation. Further, the fusion joint report 42 includes a visual representation of the heat plate, including the heating plate temperature and extrusion information recorded from the specific pipe being fused or joined. When using a dual-sided heat plate, this visual indication includes the left face temperature and the right face temperature, as well as the temperature at predetermined locations on the face of the heat plate. In addition, the joint number, lot information, intermediate fusion status, date, and time are also indicated and represented in appropriate alignment with the visual indication of the sides of the heat plate. Further, the condition data 50 includes any notes or comments on the site conditions.

As illustrated in FIG. 5, the instruction data 52 includes specific information related to the specific pipe being fused, including pipe diameter, pipe dimensional ratio, pipe color, piston area, safe pull force, bend radius, heat pressure, fusion pressure, maximum fusion temperature, minimum fusion temperature, and/or maximum temperature variance. This information is provided in order to allow the user U to quickly identify any differences or departures for any of the listed parameters (e.g., heat pressure, fusion pressure, temperature, etc.), which may lead to possible issues in the fusion process or with the resulting fusion joint. The fusion joint report 42 also provides areas for comments, recommendations, and notes, which constitutes information that may be provided by the user U and/or the technician T.

In operation, the user U (or administrator) receives the activity data 38 at the activity interface 26 on a substantially real-time basis; however, this data 38 can also be received on a periodic basis, a predetermined basis, a set basis, or the like. This allows the user U to serially review each incoming fusion joint by reviewing the fusion joint report 42 in a timely manner. In order to identify variations or other potential errors or items requiring further attention, it is envisioned that visual or audible alarms or other similar indications can be generated or displayed both at the activity interface 26, as well as in connection with a generated fusion joint report 42. For example, if the heat plate temperature or the fusion pressure is outside of the acceptable boundaries, the associated data can be brought to the user's U attention through an alarm, increased font size, font color, or the like. This allows for the preemptive analysis and identification of possible issues or exceptions in a fused joint. By allowing this to occur in a quick manner (such as prior to pipe installation), any such errors, exceptions, or issues can be quickly and effectively addressed, such as through a call, e-mail, or other communication to the technician T. In addition, the line item on the activity interface 26 can also be highlighted or otherwise set apart from the other, acceptable items or joints.

Figure 6:
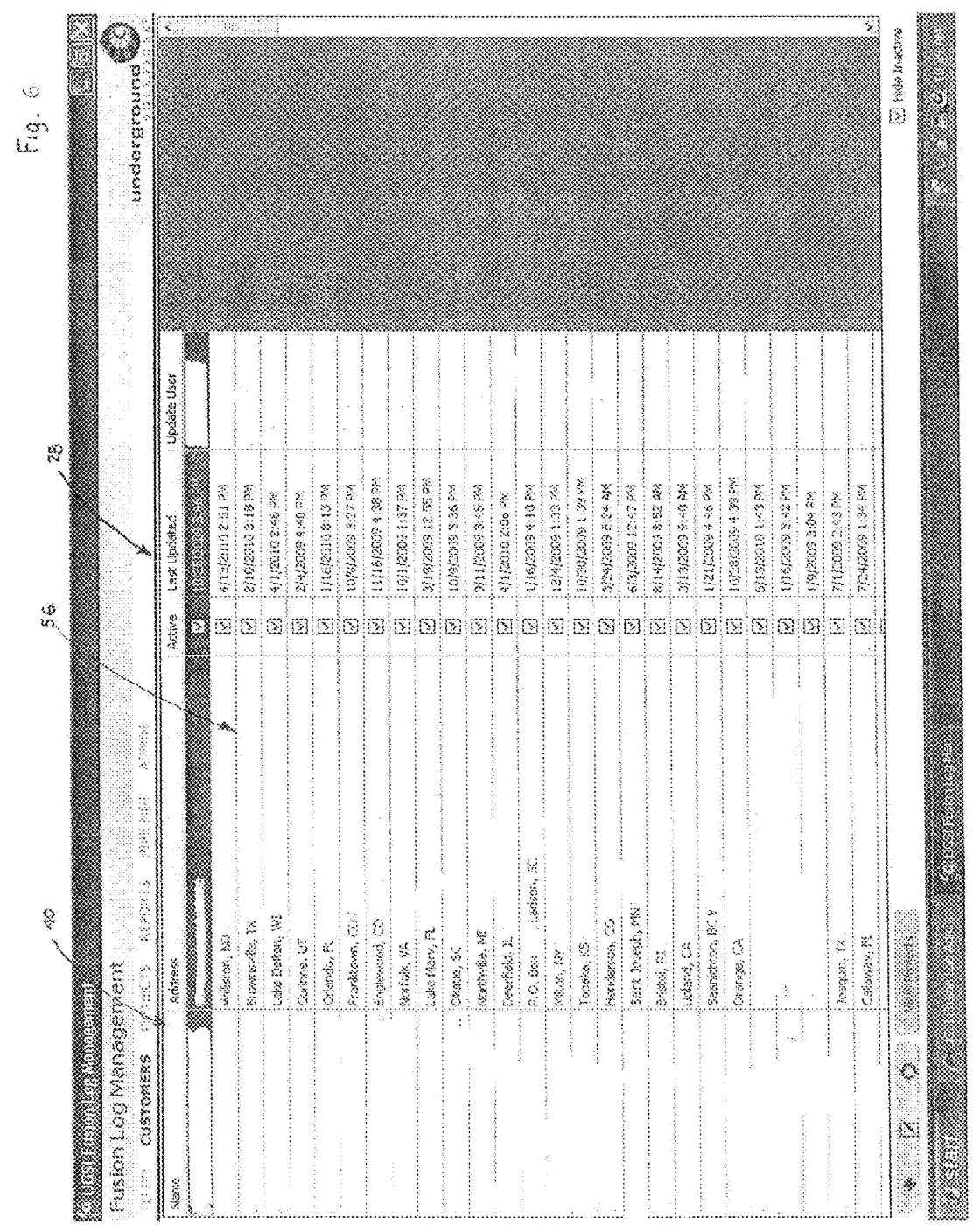

FIG. 6 provides one preferred and non-limiting embodiment of the customer interface 28. The customer interface 28 accepts user selection of one or more items, again which are arranged in column and row format, and can be sorted by selecting a button 40 (in this or any of the itemized lists discussed below). The customer interface 28 represents an interactive interface for viewing, arranging, providing, configuring, and/or outputting customer data 56, such as customer name, customer address, customer activity, update data, and/or update user. In addition, the user U may navigate to or view the projects associated with any particular customer, as well as determine whether the customer is or is not active. The update data includes the date and time that the customer information was updated, as well as the user U (typically the administrator) that made the modification and/or addition to the list.

Figure 7:
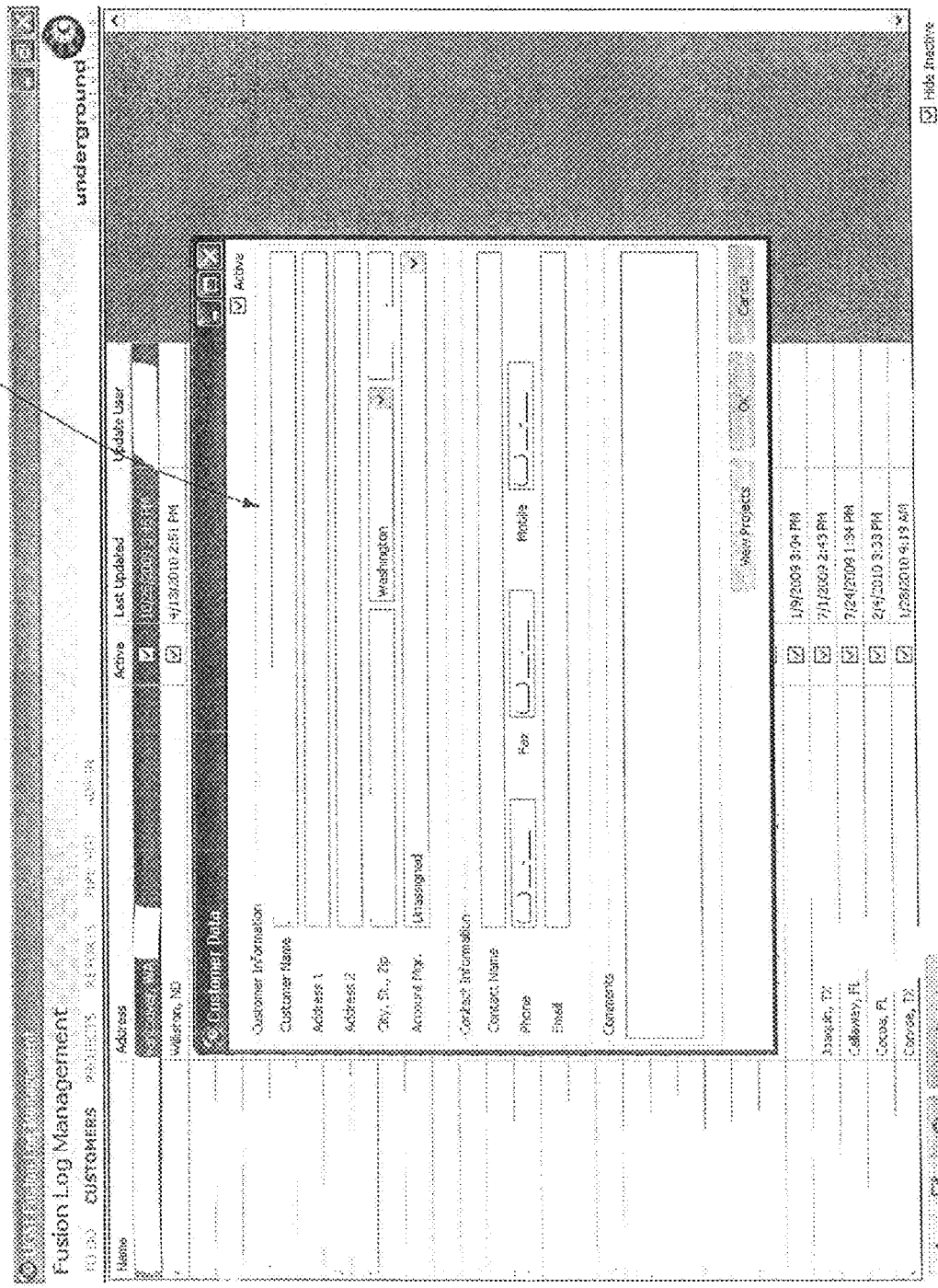

The customer interface 28 accepts a user selection of at least one item on the list, and generates an interactive interface 58 for viewing, arranging, providing, configuring, and/or outputting specific customer data 56, as shown in FIG. 7. In particular, the customer data 56 includes customer name, customer address, account manager, contact name, contact telephone data, contact e-mail data, comments, customer activity, and/or associated project data. Again, this screen (or interactive interface 58) allows the user U to add, modify, and/or delete information and data associated with a specific customer.

Figure 8:
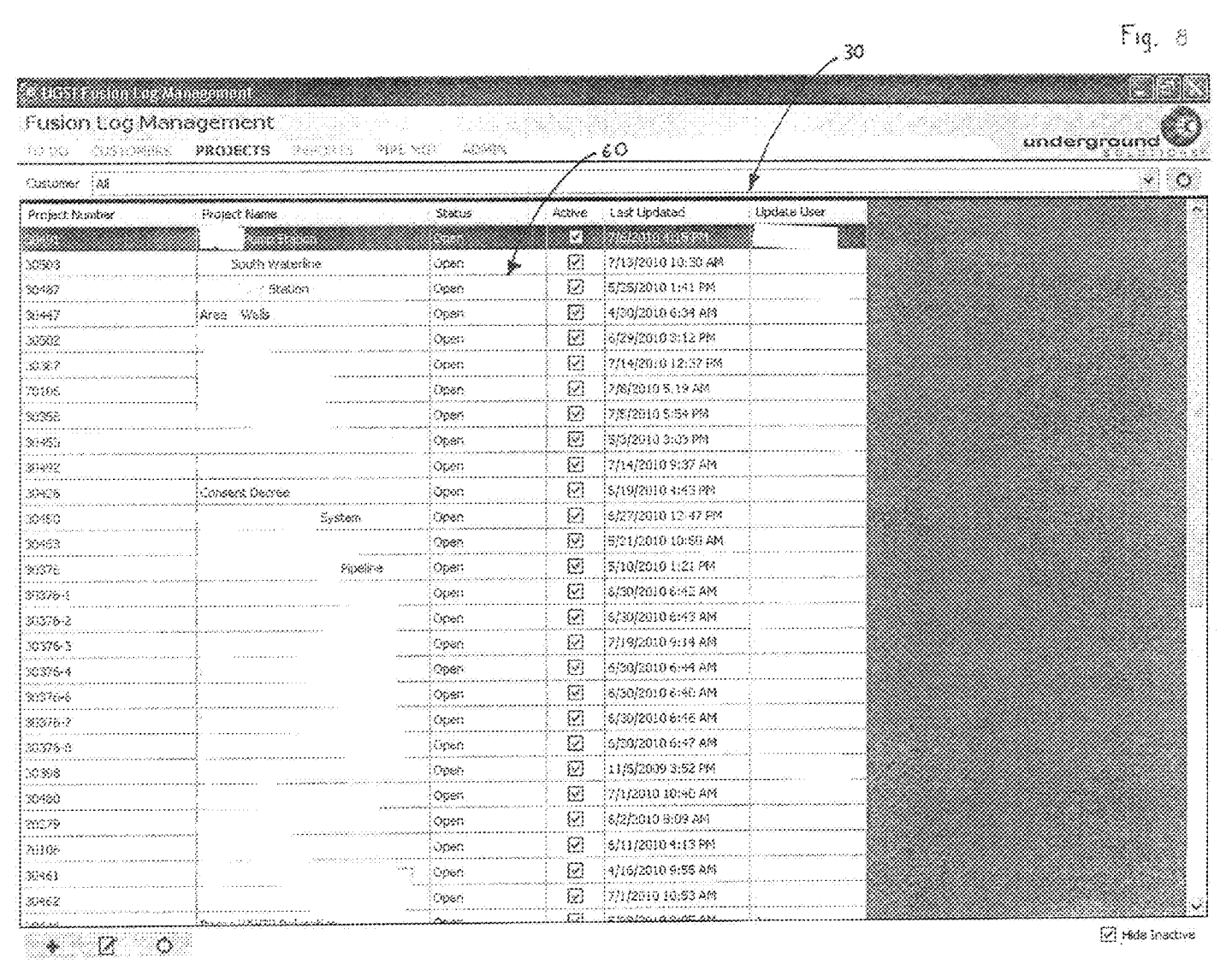

In FIG. 8, one preferred and non-limiting embodiment of the project interface 30 is illustrated. The project interface 30 is in the form of an interactive interface for viewing, arranging, providing, configuring, and/or outputting project data 60. This project data 60 includes project number, project name, status, project activity, update activity, and update user. Further, this project data 60 can be sorted according to specific customers, i.e., a customer-specific project list, or by any other desirable query, such as all customers, an alphabetical listing of customers, or the like. It should be further noted that the presented information on any of the interfaces can be reduced to hide specific items, such as inactive customers and/or projects.

The project interface 30 accepts a user selection of at least one item, and generates an interactive interface 62, as illustrated in FIG. 9. The interactive interface of FIG. 9 allows for the review, modification, addition, or deletion of project data 60 associated with a specific project in the system 10. In this interactive interface 62, the project data 60 includes project name, project number, application, fusion technician username, fusion technician name, project pipe data, pipe diameter, pipe class, pipe inside diameter, pipe outside diameter, pull force, bend radius, pipe activity, jobsite name, jobsite address, jobsite status, comments, and/or status data. This allows the user U to quickly and effectively review specific project data for a selected project for tracking and review purposes. Additionally, any comments that the user U may have can be provided in this interactive interface 62.

As illustrated in FIG. 10, the status history for any particular project can also be viewed, and includes the sequence number, the status, any comments, the update date and time, as well as the user that updated the project data 60. This allows for the appropriate tracking of modifications that are made to this (or any) of the interfaces.

Figure 11:
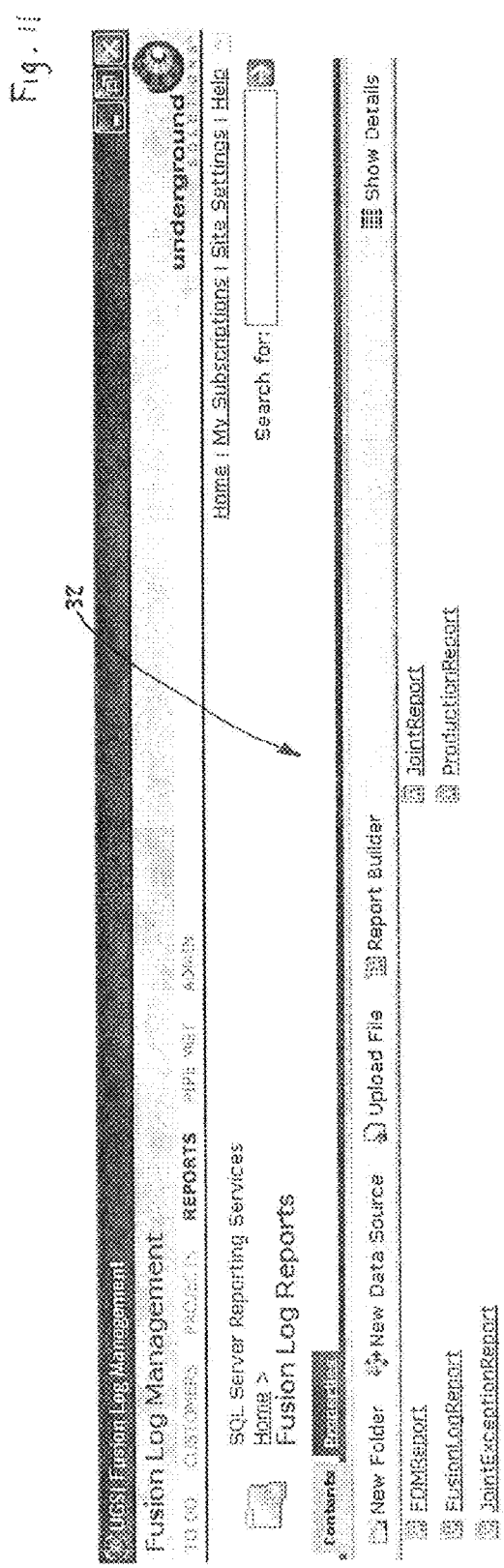

FIG. 11 illustrates one preferred and non-limiting embodiment of the report interface 32, which allows the user U to select and generate certain specific reports, as discussed hereinafter. In particular, the report interface 32 accepts a user selection of at least one report type, and generates a report populated with data based upon the user-selected criteria. In this embodiment, the report type includes a fusion data management report 64, a fusion log report 66, a joint exception report 68, a joint report 70, and a production report 72. In addition, the report interface 32 may include a variety of functionality for creating new folders, identifying new data sources, uploading files, building reports, reviewing the details of the reports, searching for previous reports, and the like.

FIG. 12 provides a portion of one exemplary fusion data management report. This fusion data management report 64 can be configured or modified based upon starting date, ending date, as well as a variety of format options. In addition, the fusion data management report 64 can be reviewed on the screen of the user U, or printed for further review and analysis. In addition, the fusion data management report 64 includes a large amount of data, including pull number, joint number, joint, fusion date, fusion technician first name, fusion technician last name, dimensional ratio, pipe diameter, inside diameter, outside diameter, pipe color, pipe extruder, pipe description, fusion machine identification, fusion machine manufacturer, fusion machine serial number, piston area, heat plate type, heat plate manufacturer, heat plate serial number, data logger manufacturer, data logger serial number, pyrometer type, pyrometer manufacturer, pyrometer serial number, drag, heat expected, heat entered, fusion expected, fusion entered, temperature, ambient pipe temperature, weather conditions, start time, end time, heating time in minutes, heating time in seconds, pipe temperature end, intermediate fusion, left face area temperatures, left pipe lot number, left pipe manufacturing date, left pipe length, right face area temperatures, right pipe lot number, right pipe manufacturing date, right pipe length, site conditions, safe pull force expected, safe pull force entered, bend radius expected, bend radius entered, heat pressure expected, heat pressure entered, fusion pressure expected, fusion pressure entered, maximum fusion temperature expected, maximum fusion temperature entered, minimum fusion temperature expected, minimum fusion temperature entered, maximum temperature variance expected, maximum temperature variance entered, maximum facing pressure, comments, fusion audit status, job name, job address, job city, job state, job zip code, job comments, job audit status, project number, project name, project application, customer name, customer address, customer city, customer state, customer zip code, customer contact, customer phone number, customer facsimile number, customer e-mail, and customer comments.

FIG. 13 provides one exemplary fusion log report 66, which also can be generated according to starting or ending dates and in a variety of formats (as well as viewed and/or printed). A printout of this exemplary fusion log report 66 of FIG. 13 is provided in FIG. 14. Further, this fusion log report 66 is a joint-specific report and includes substantially the same information as the fusion joint report 42 illustrated in FIGS. 4 and 5. In particular, the fusion log report 66 includes the joint-specific fusion data 44, pipe data 46, equipment data 48, and condition data 50. While not intended to be limiting, a "fusion report" is a report that is commonly required by the customer to document that some or all of the fusion joint data is within acceptable parameters or limits.

Figure 15:
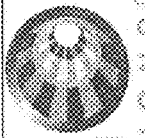

An exemplary joint exception report 68 is shown in FIG. 15, and can be generated as discussed above, e.g., according to date ranges and in a variety of viewable or printable formats. In this embodiment, the joint exception report 68 includes job number, joint number, pipe size, pipe rating, technician, fusion date, heating time, left pipe face temperatures, right pipe face temperatures, overall temperature range, expected heat temperature, entered heat temperature, expected heat pressure, entered heat pressure, expected fusion time, entered fusion time, expected fusion pressure, entered fusion pressure, ambient pipe temperature, pipe temperature at process completion, intermediate fusion identification, and comments. This joint exception report 68 allows the user U to identify those joints that have been specifically identified for a variety of reasons, e.g., temperatures or pressures outside of certain acceptable, defined, and/or required boundaries or ranges.

Figure 16:
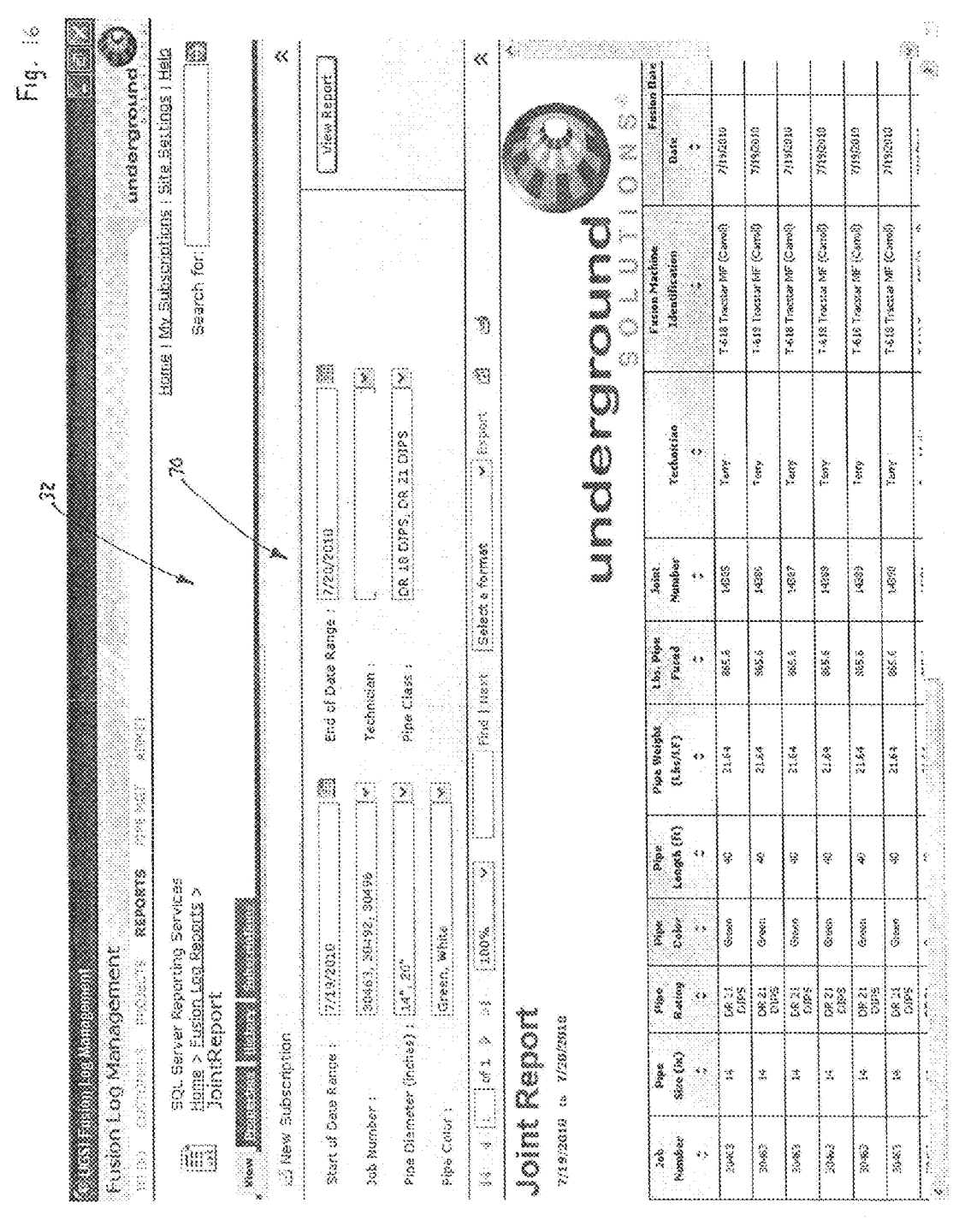

FIG. 16 represents an exemplary joint report. This joint report 70 can be arranged and generated in a variety of formats, as well as according to date ranges, job number, pipe diameter, pipe color, technician, and pipe class. Again, this allows for the accurate configuration and arrangement of certain data for review and identification for tracking purposes. As above, only a portion of the report is illustrated, the data included on the joint report 70 includes job number, pipe size, pipe rating, pipe color, pipe length, pipe weight, pounds of pipe fused, joint number, technician, fusion machine identification, fusion date, fusion starting time, fusion ending time, joint time, average heat plate temperature on the left and right faces, maximum temperature variance on the left and right faces, heat pressure, fusion pressure, drive pressure, pull number, and comments.

Figure 17:
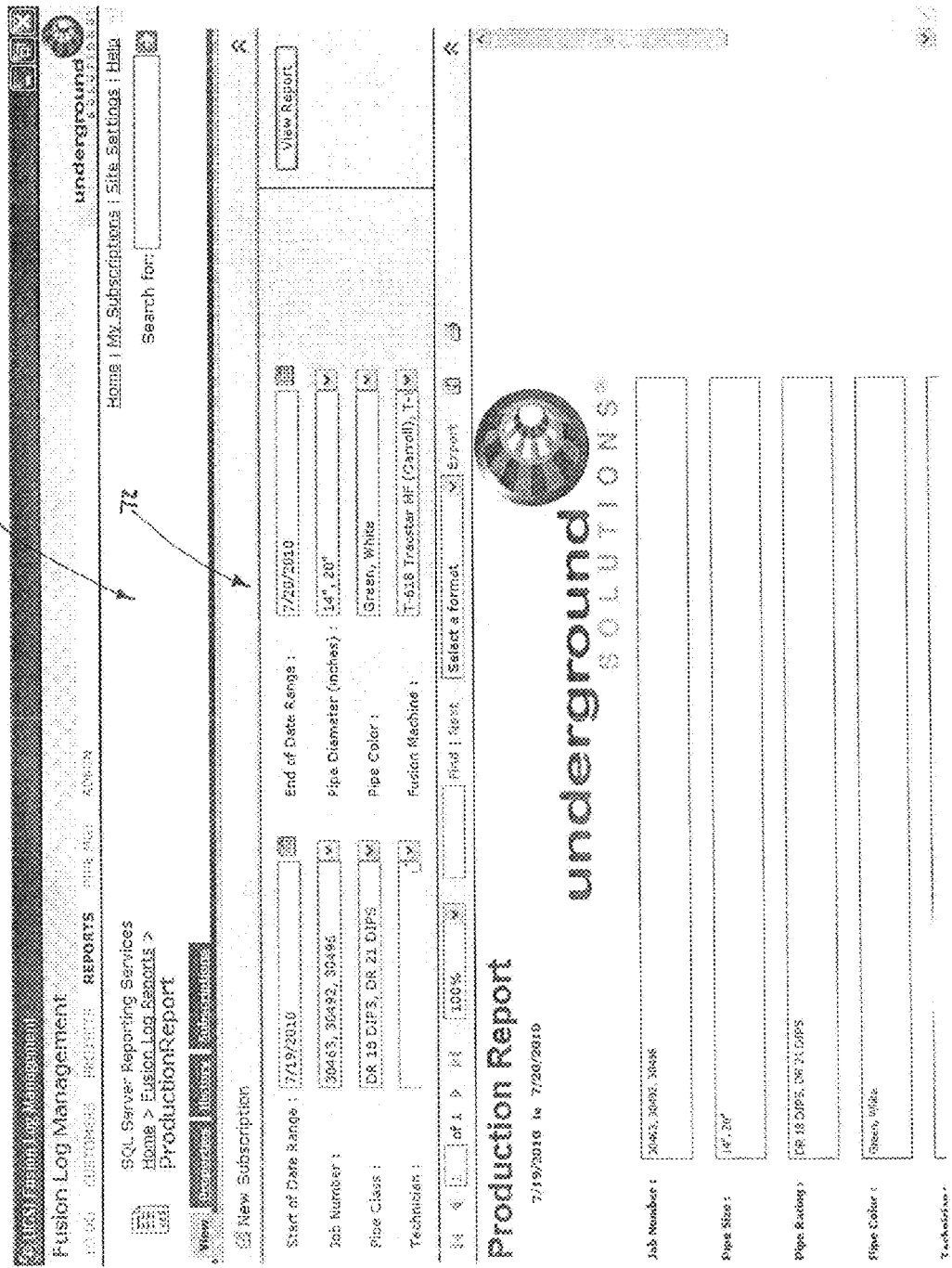
Figure 18:

FIG. 17 represents an exemplary production report, which can be formatted and arranged according to date range, job number, pipe class, technician, pipe diameter, pipe color, and fusion machine. A printout of one exemplary production report 72 is illustrated in FIG. 18, and this production report 72 includes job number, pipe size, pipe rating, pipe color, technician, machine, total fusion days, total joints, joints per fusion day, feet per fusion day, average joint time, and average daily joint start time difference. Again, such information provides for the effective review and control of each fusion process, as well as production information and data for review and consideration.

Figure 19:
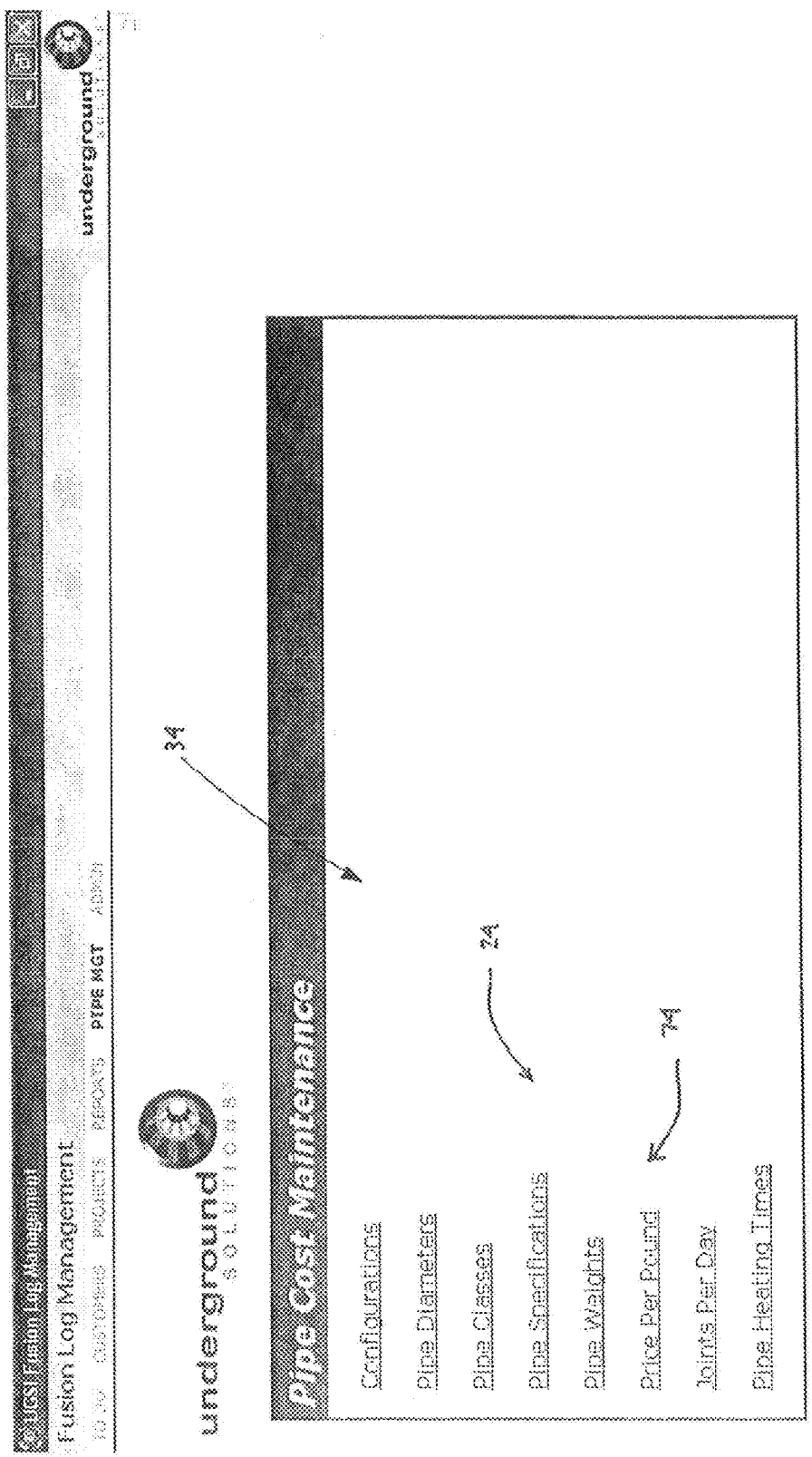

FIG. 19 illustrates one preferred and non-limiting embodiment of the pipe management interface 34. Further, the pipe management interface 34 accepts a user selection of at least one item (such as through a selectable element 24) and generates an interactive interface for viewing, arranging, providing, configuring, and/or outputting pipe management data 74. In this embodiment, the pipe management data 74 includes configuration data 76, pipe diameter data 78, pipe class data 80, pipe specification data 82, pipe weight data 84, price per pound data 86, joints per day data 88, and pipe heating data 90. In particular, at the pipe management interface 34, the user U may select one of the selectable elements 24 to navigate to the appropriate interactive interface indicated.

FIG. 20 displays the configuration data 76, including identification, freight rate, labor rate, hotel rate, per diem, consumables, company vehicle, margin, miscellaneous, minimum freight charge, and markup, and any of these data fields are capable of being modified by the user U. FIG. 21 presents the pipe diameter data 78, including pipe inside diameter and pipe outside diameter. Again, these fields are editable, and the user U can also add new pipe diameter data.

Figure 22:
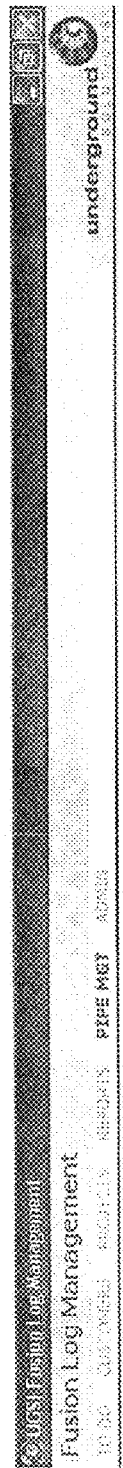
Figure 24:

FIG. 22 presents pipe class data, including pipe class inside diameter, and description. These fields can be modified, and a new pipe class can also be added. FIG. 23 represents the pipe specification data, and displays the appropriate pipe specification data 82 according to the pipe class. This pipe specification data 82 includes pipe diameter, minimum length, maximum length, outside diameter, wall thickness, and safe pull force, and this information can also be modified by the user U. FIG. 24 illustrates how the user U can select a different pipe class on the interface presenting the pipe specification data 82 of FIG. 23.

Figure 25:
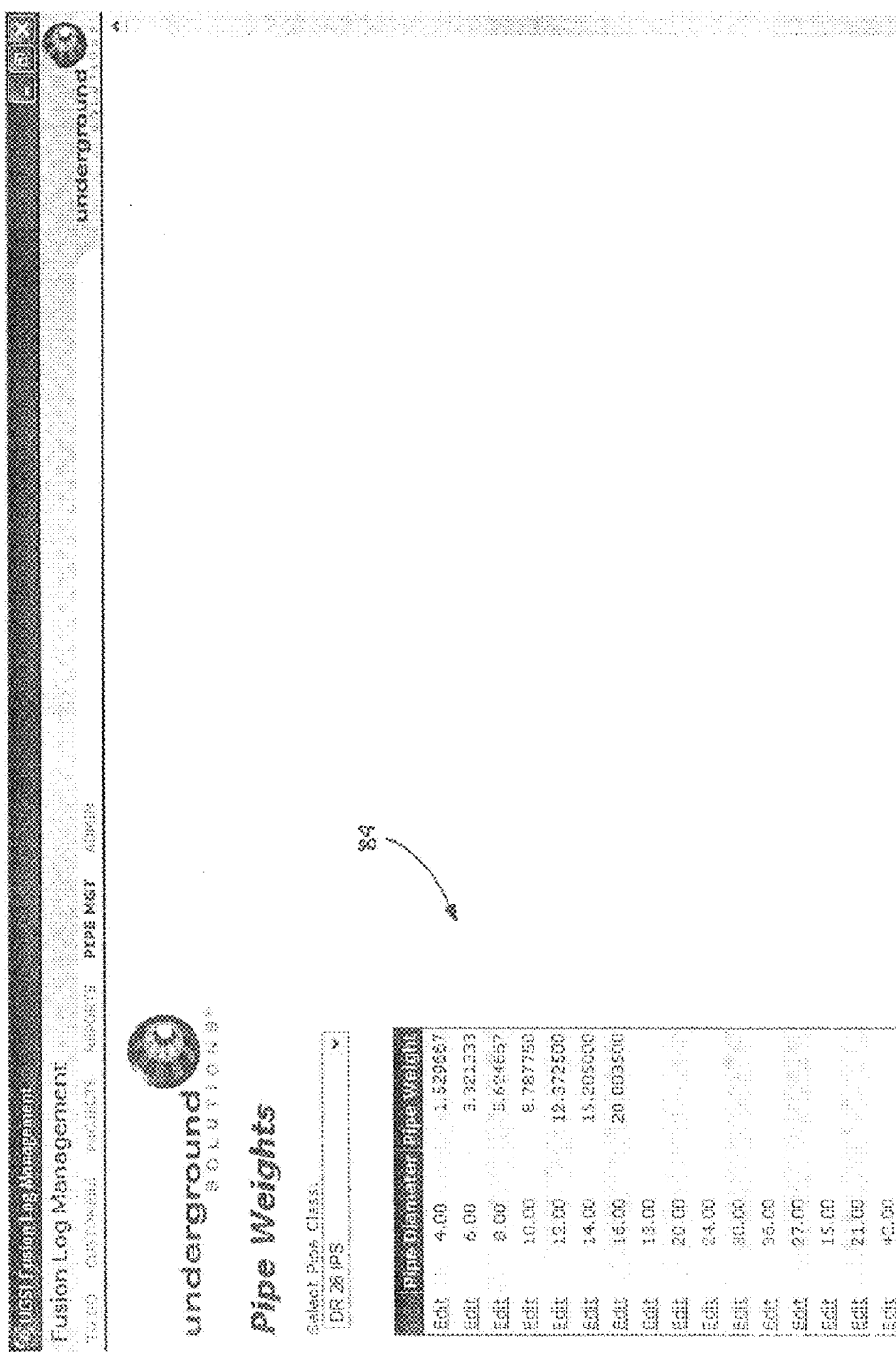
Figure 26:
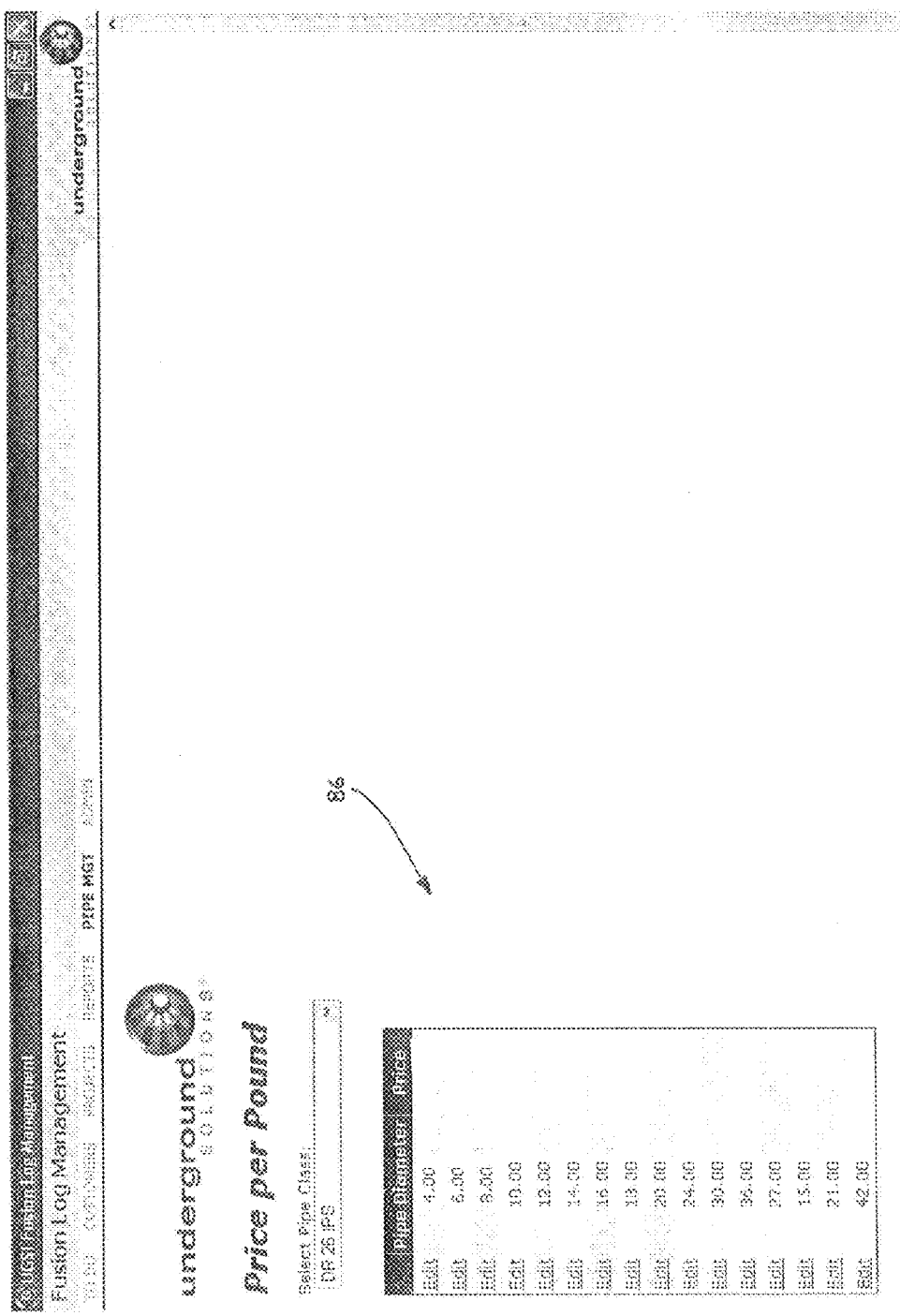
Figure 27:
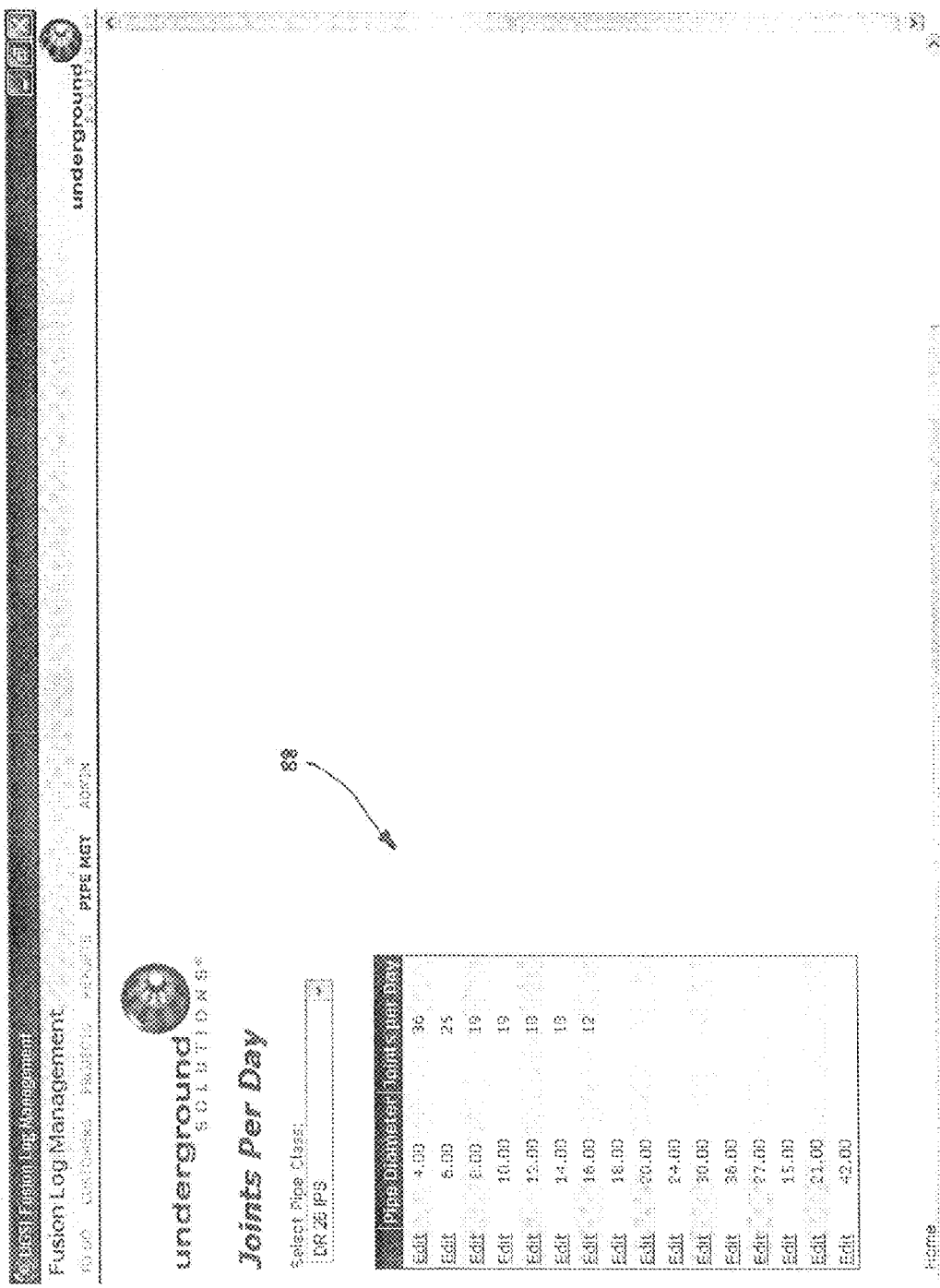
Figure 28:
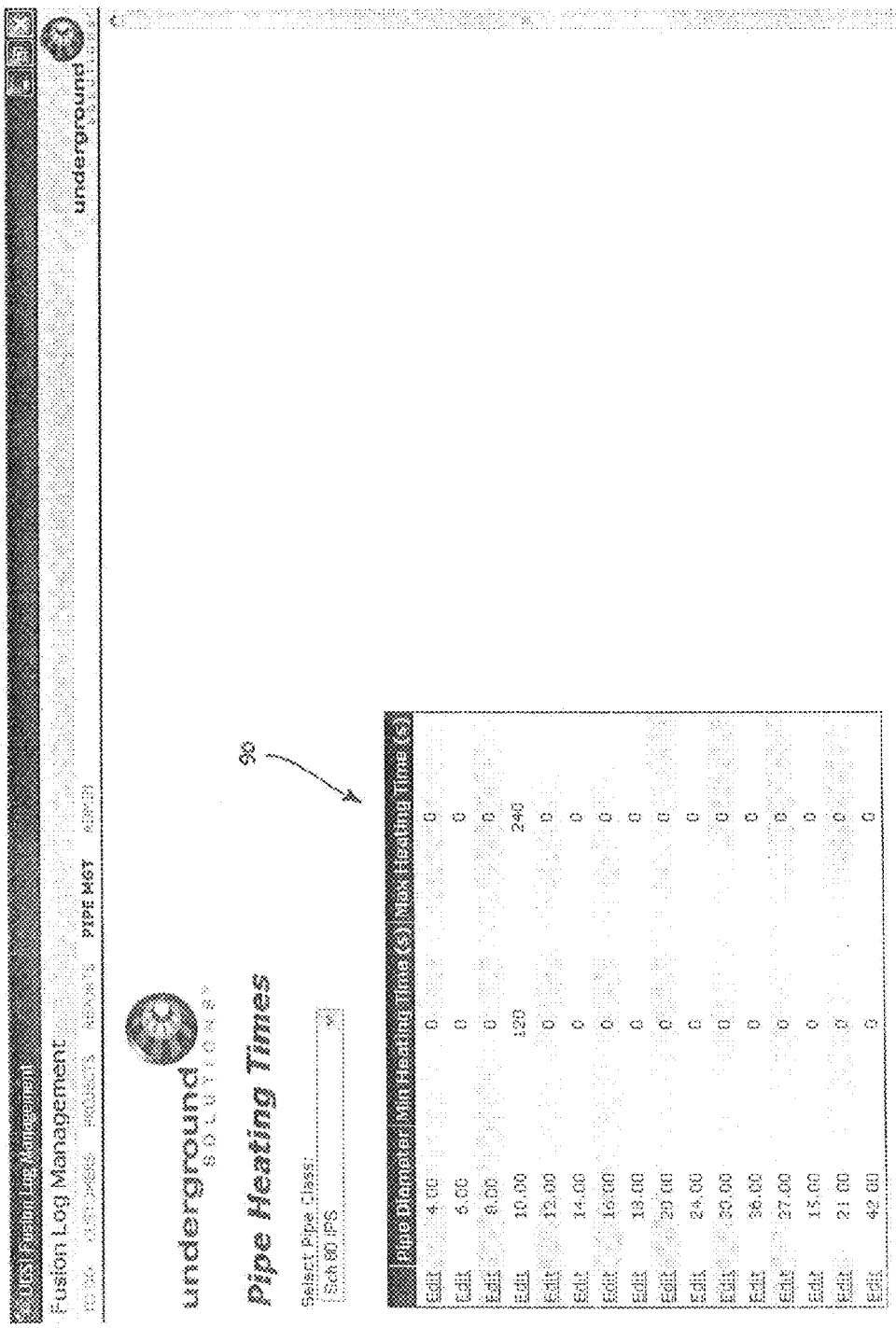

FIG. 25 provides the pipe weight data 84, which can be modified and sorted with respect to pipe class. This pipe weight data 84 includes pipe diameter and pipe weight. FIG. 26 illustrates the presentation of price per pound data, which also can be changed and sorted according to pipe class. The price per pound data 86 includes pipe diameter and price. FIG. 27 illustrates the joints per day data 88, which can be modified and sorted according to pipe class. The joints per day data 88 includes pipe diameter and joints per day. Finally, the pipe heating data 90 is illustrated in FIG. 28, and this information can be modified and sorted according to pipe class. The pipe heating data 90 includes pipe diameter, minimum heating time, and maximum heating time.

Figure 29:
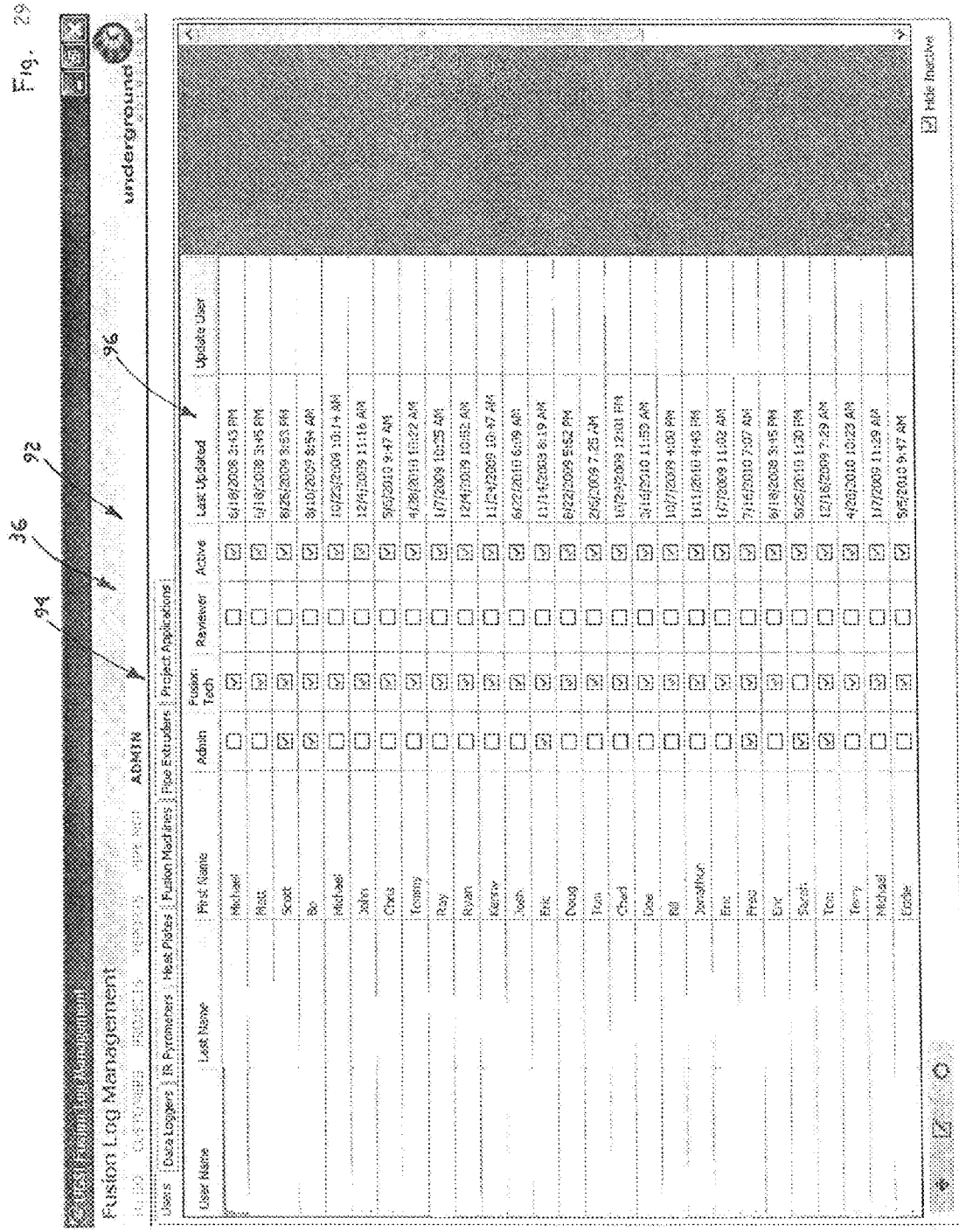
Figure 36:
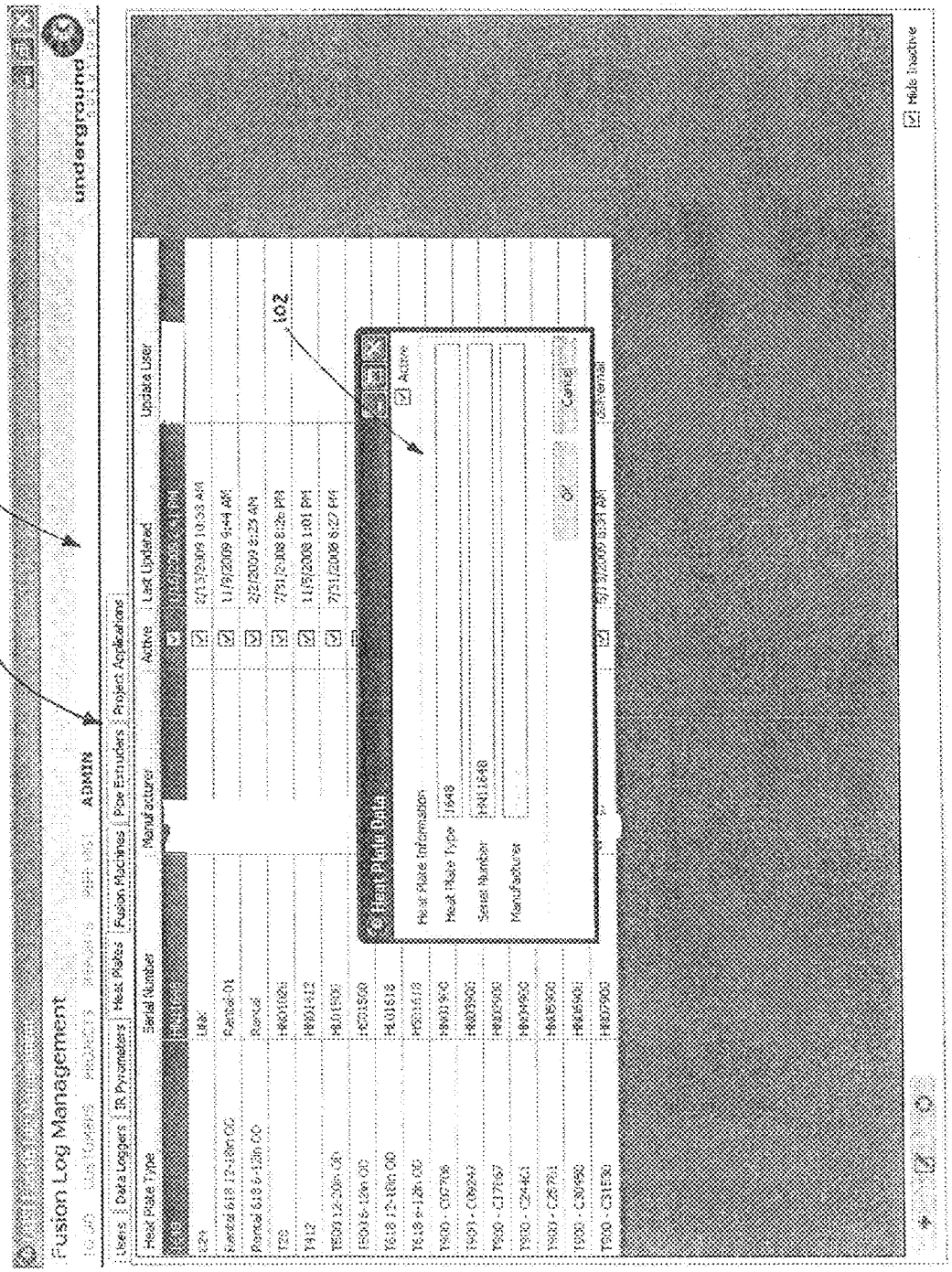

FIG. 29 shows one preferred and non-limiting embodiment of the administration interface 36. The administration interface 36 includes an interactive interface for viewing, arranging, providing, configuring, and/or outputting the administration data 92. In addition, the administration interface 36 provides multiple tabs 94 that allow for the viewing, adding, deleting, and modifying various sets of information. In this embodiment, this information includes user data 96, data logger data 98, pyrometer data 100, heat plate data 102, fusion machine data 104, pipe extruder data 106, and project application data 108. In each of these specified portions navigable through the use of the tabs 94, the specific and related set of information is provided, and may be sorted or manipulated in any desirable manner.

Figure 30:
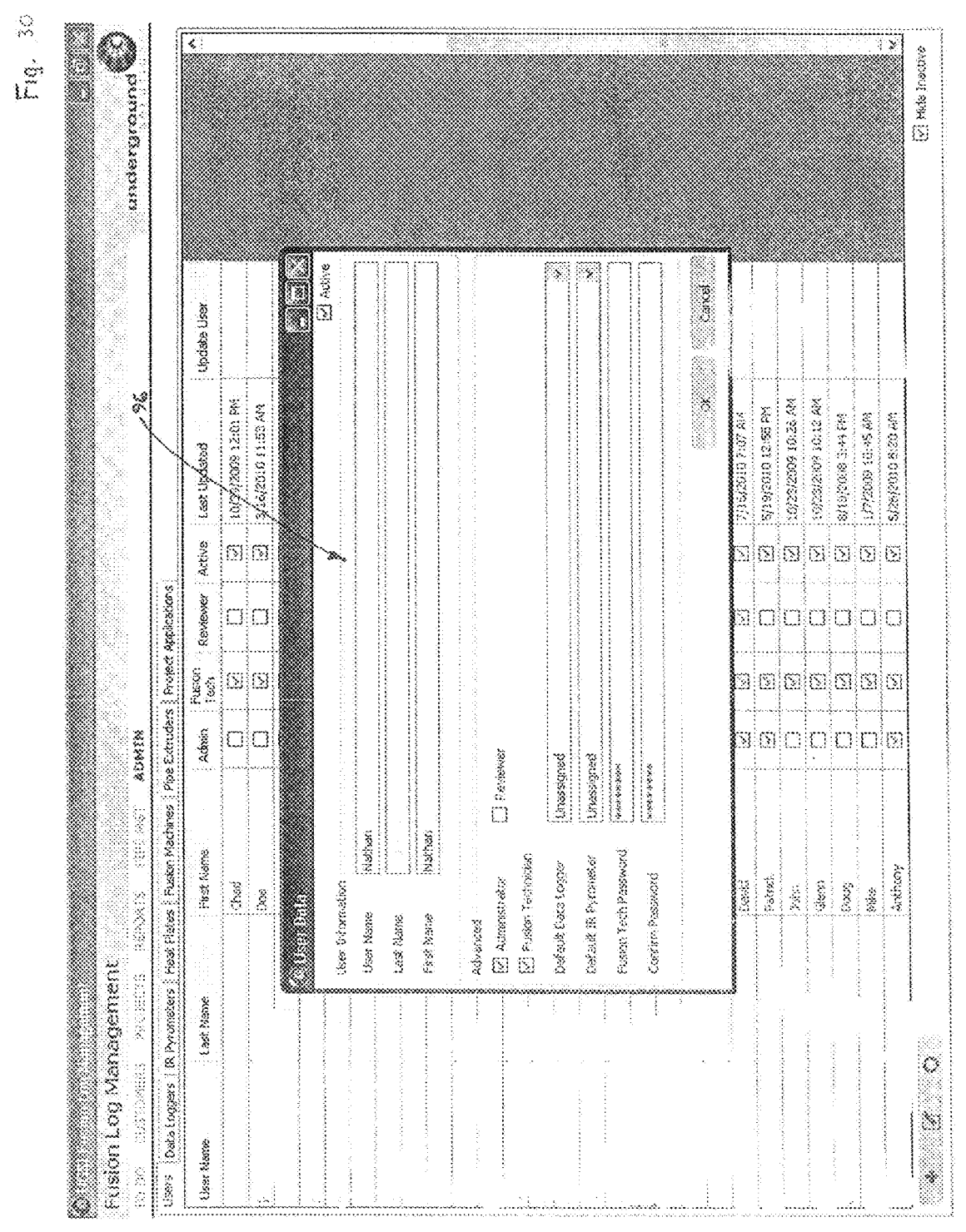

FIG. 29 shows the user data 96, which is arranged in the specified tabbed area of the administration interface, and this user data 96 includes user name, last name, first name, user type (administrative, fusion technician, reviewer, active), last update, and update user. In this manner, the user U can select a specific line item, which opens an interactive interface as illustrated in FIG. 30. In this interactive interface, certain user data 96 can be modified, including user name, last name, first name, user type, default data logger, default pyrometer, password, and activity status. Further, the data logger and pyrometer information can be selected from a drop-down menu.

Figure 31:
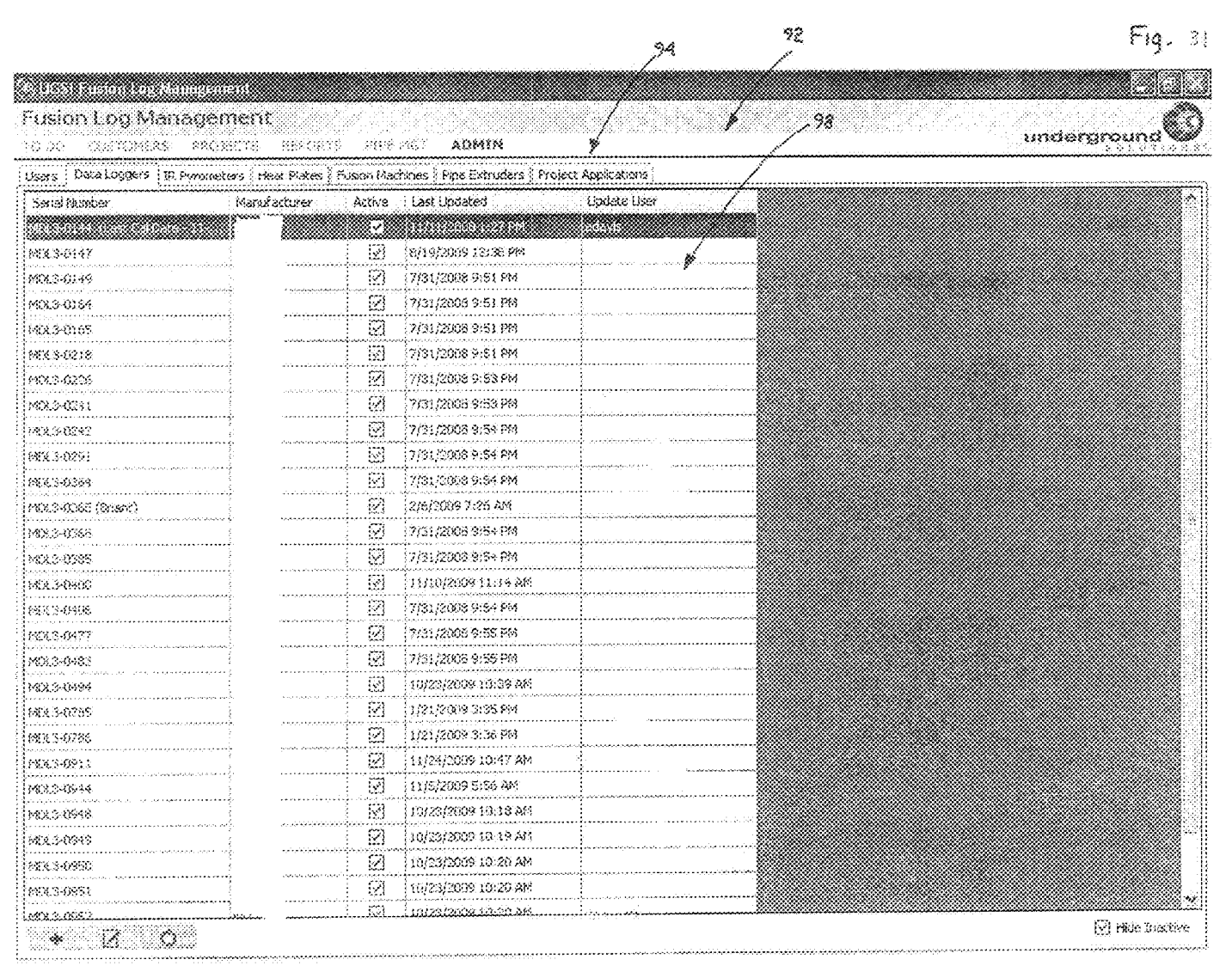
Figure 32:
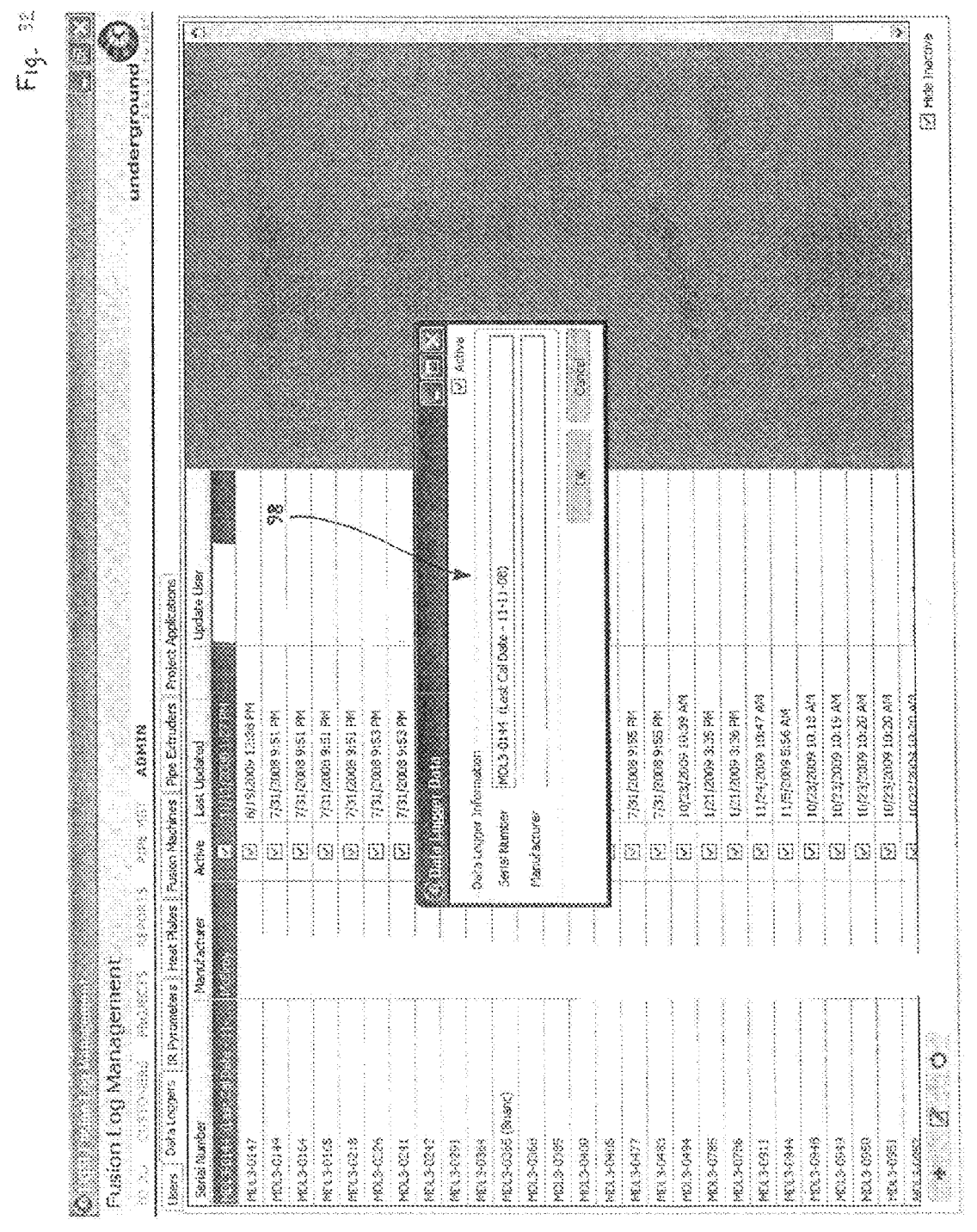
Figure 33:
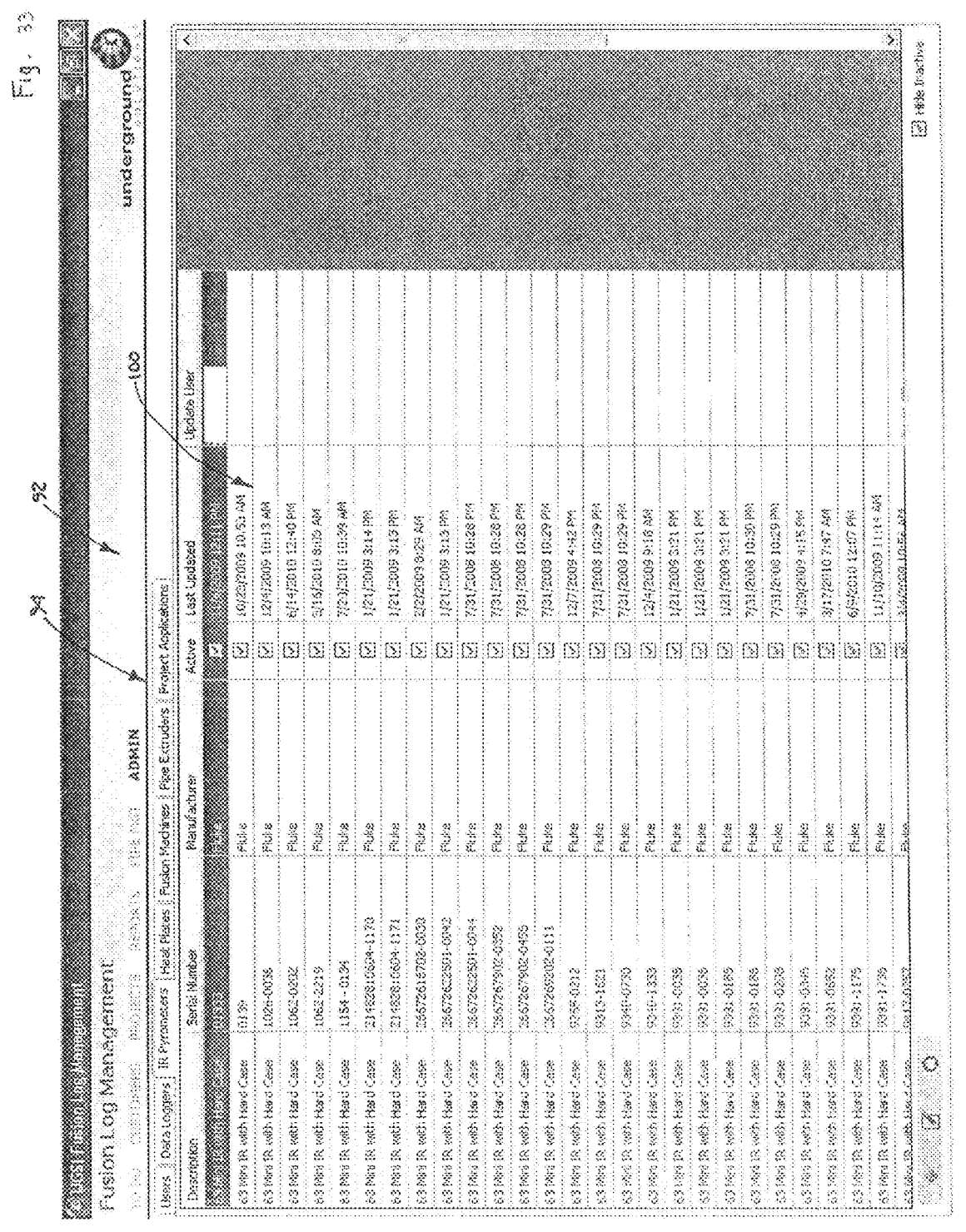
Figure 34:
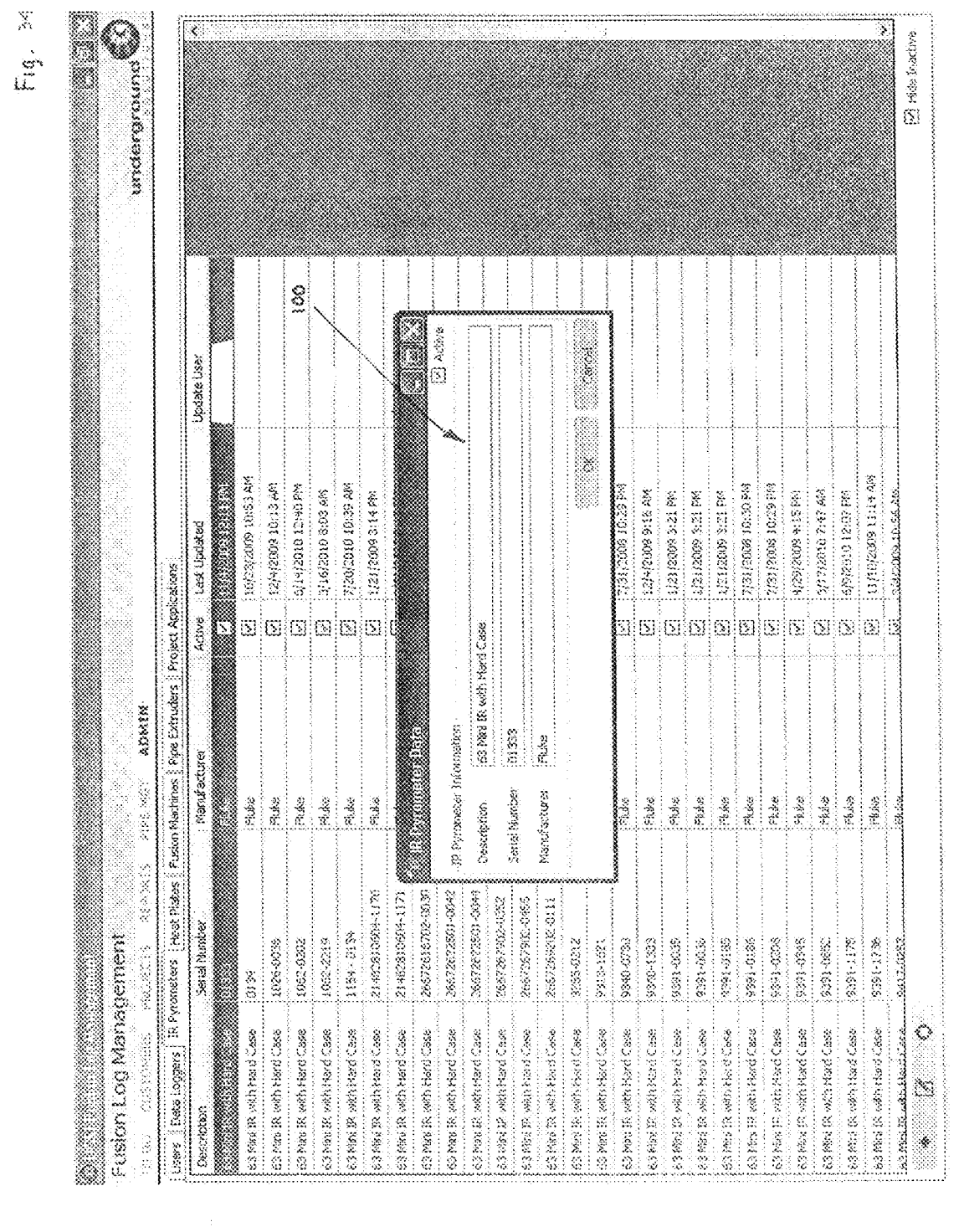

FIG. 31 illustrates the section navigable from the tab 94 relating to data logger data 98. This data logger data 98 can be viewed, sorted, added, deleted, and/or modified, and further, this data logger data 98 includes serial number, manufacturer, activity data, update data, and update user. If one of the line items is selected, an interactive interface is provided for viewing, arranging, providing, configuring, and/or outputting specified data logger data 98, as illustrated in FIG. 32. In particular, this data logger data 98 includes serial number, manufacturer, and activity data. FIG. 33 illustrates the portion of the administration interface 36 navigable through the tab 94 leading to pyrometer data, which can be viewed, sorted, added, deleted, and modified as discussed above. The pyrometer data 100 includes description, serial number, manufacturer, activity data, update data, and update user. If one of the line items is selected in this portion presenting pyrometer data 100, the user U is presented with the screen illustrated in FIG. 34, which provides pyrometer description, serial number, manufacturer, and activity data.

Figure 35:
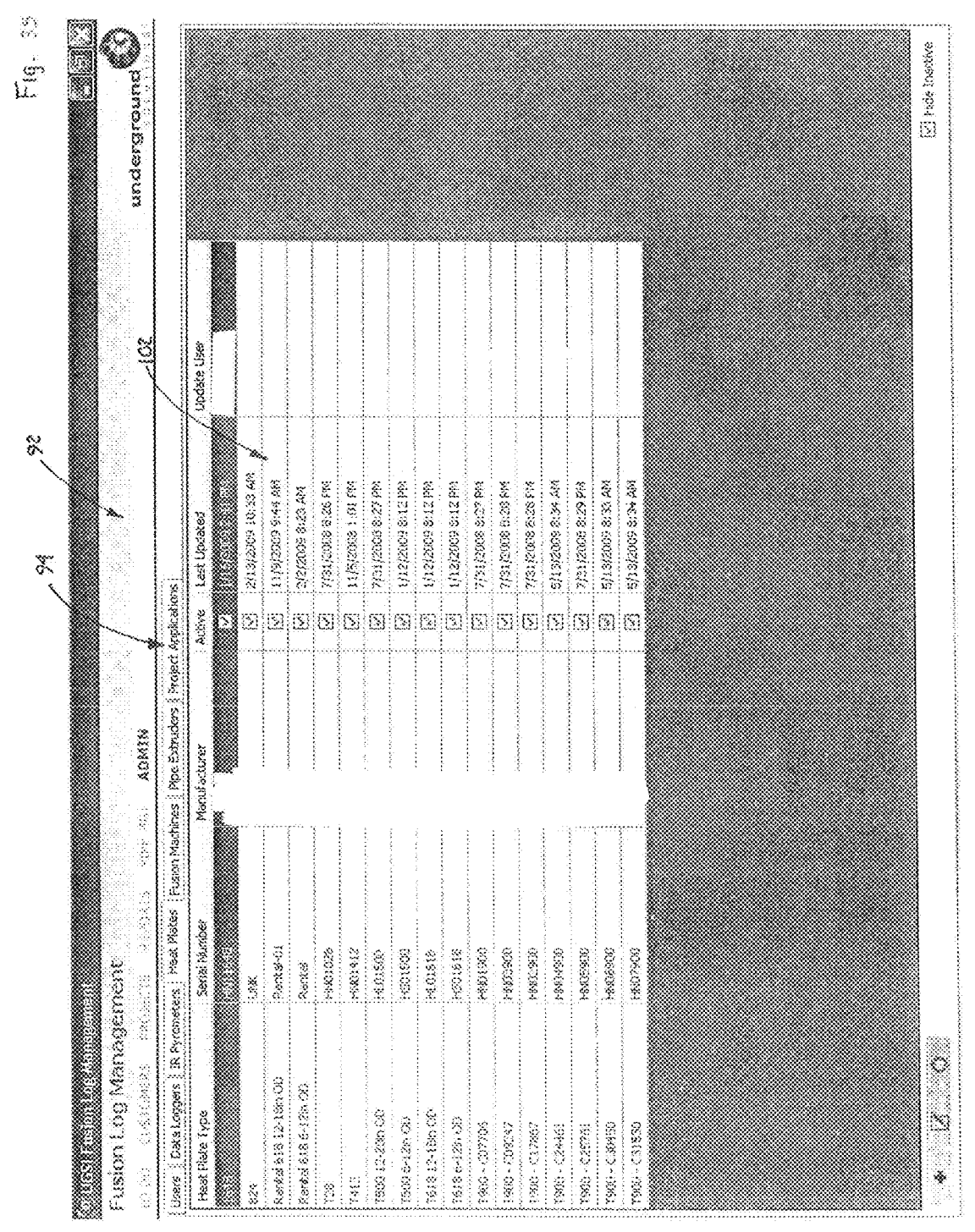

The heat plate data 102 is arranged in the specified tabbed area of the administration interface 36 as illustrated in FIG. 35, and this heat plate data 102 includes heat plate type, serial number, manufacturer, activity data, update data, and update user. If one of the line items is selected, it can be viewed, sorted, added, deleted, or modified in the interface illustrated in FIG. 36. As shown, the user U can view, sort, add, delete, and modify certain heat plate data 102, including heat plate type, serial number, manufacturer, and activity data.

Figure 37:
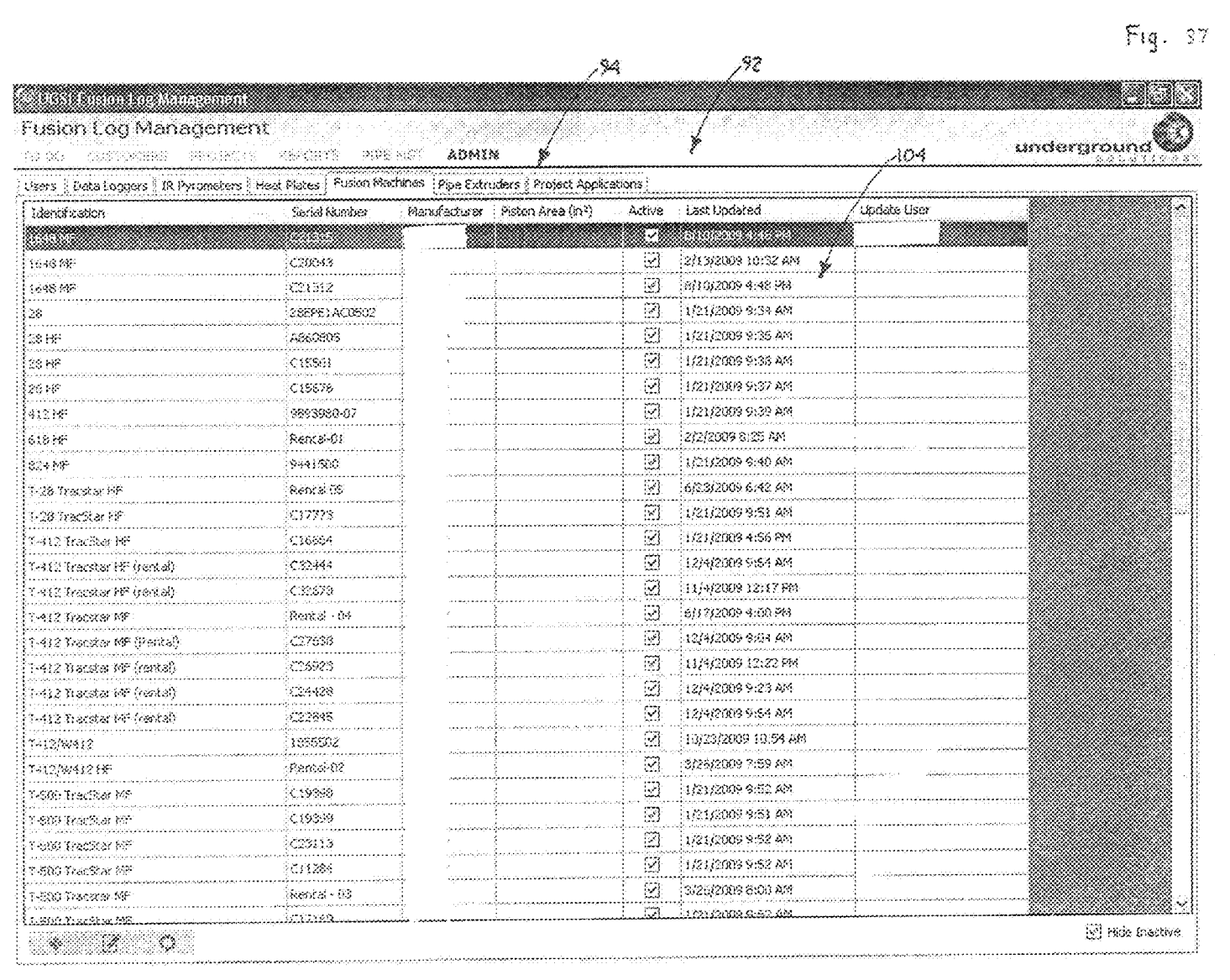
Figure 38:
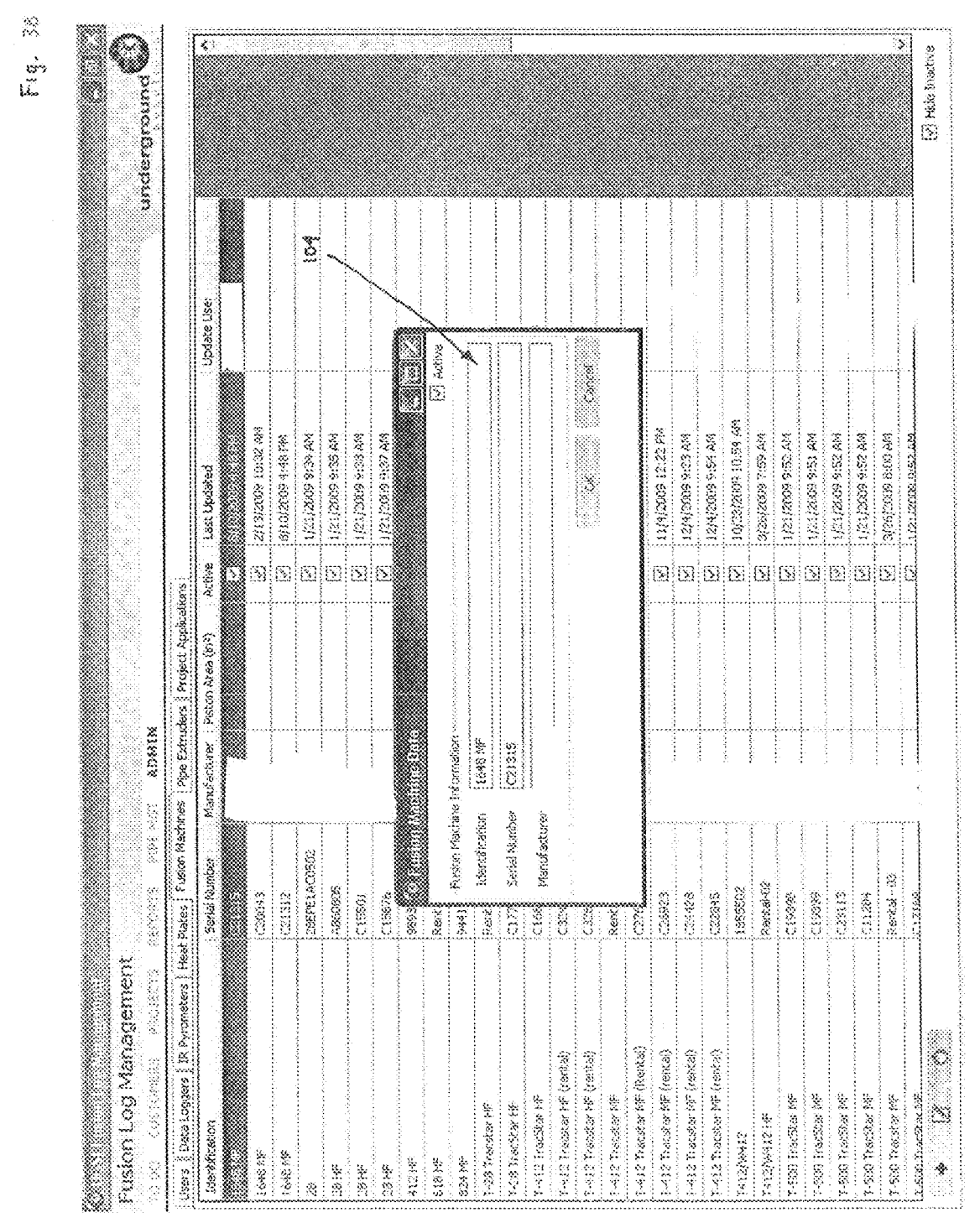

The fusion machine data 104 (as illustrated in FIG. 37) is presented and can be sorted as discussed above. Further, this fusion machine data 104 includes identification, serial number, manufacturer, piston area, activity data, update data, and update user. If the user U selects an item, an interactive interface is generated as illustrated in FIG. 38. This allows the user U to view, add, delete, and modify specific fusion machine data 104, including identification, serial number, manufacturer, and activity data.

Figure 39:
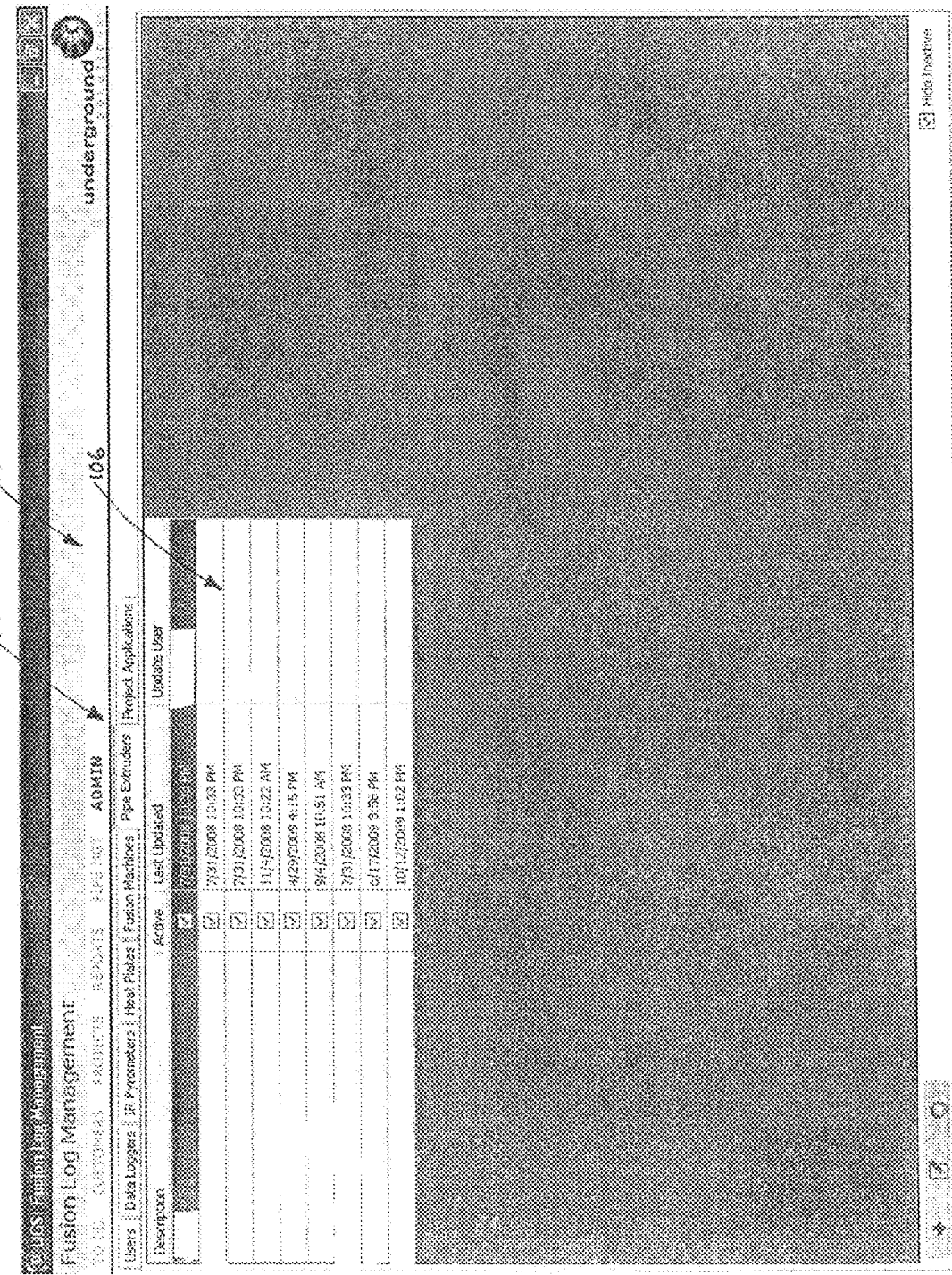
Figure 40:
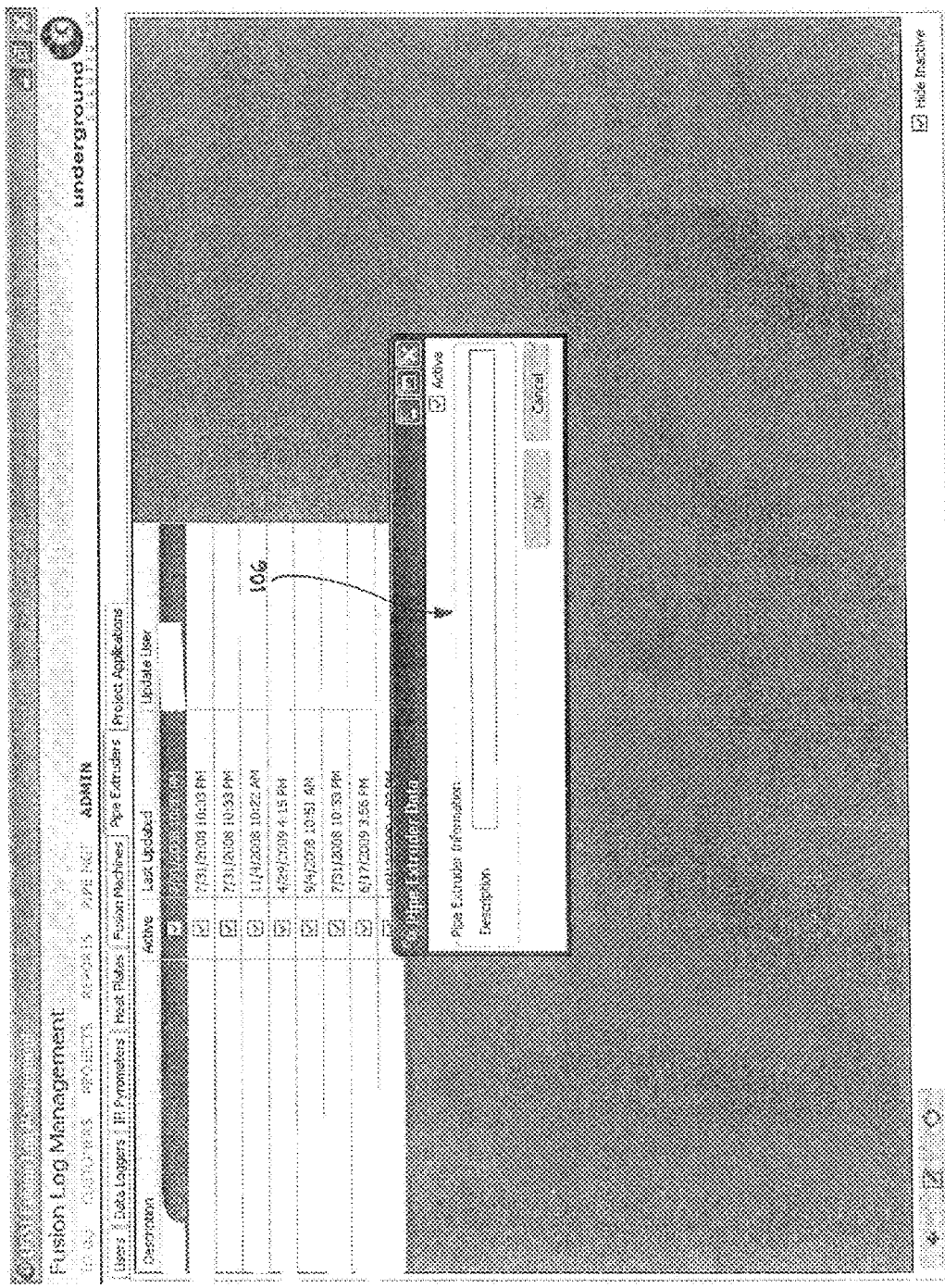
Figure 41:
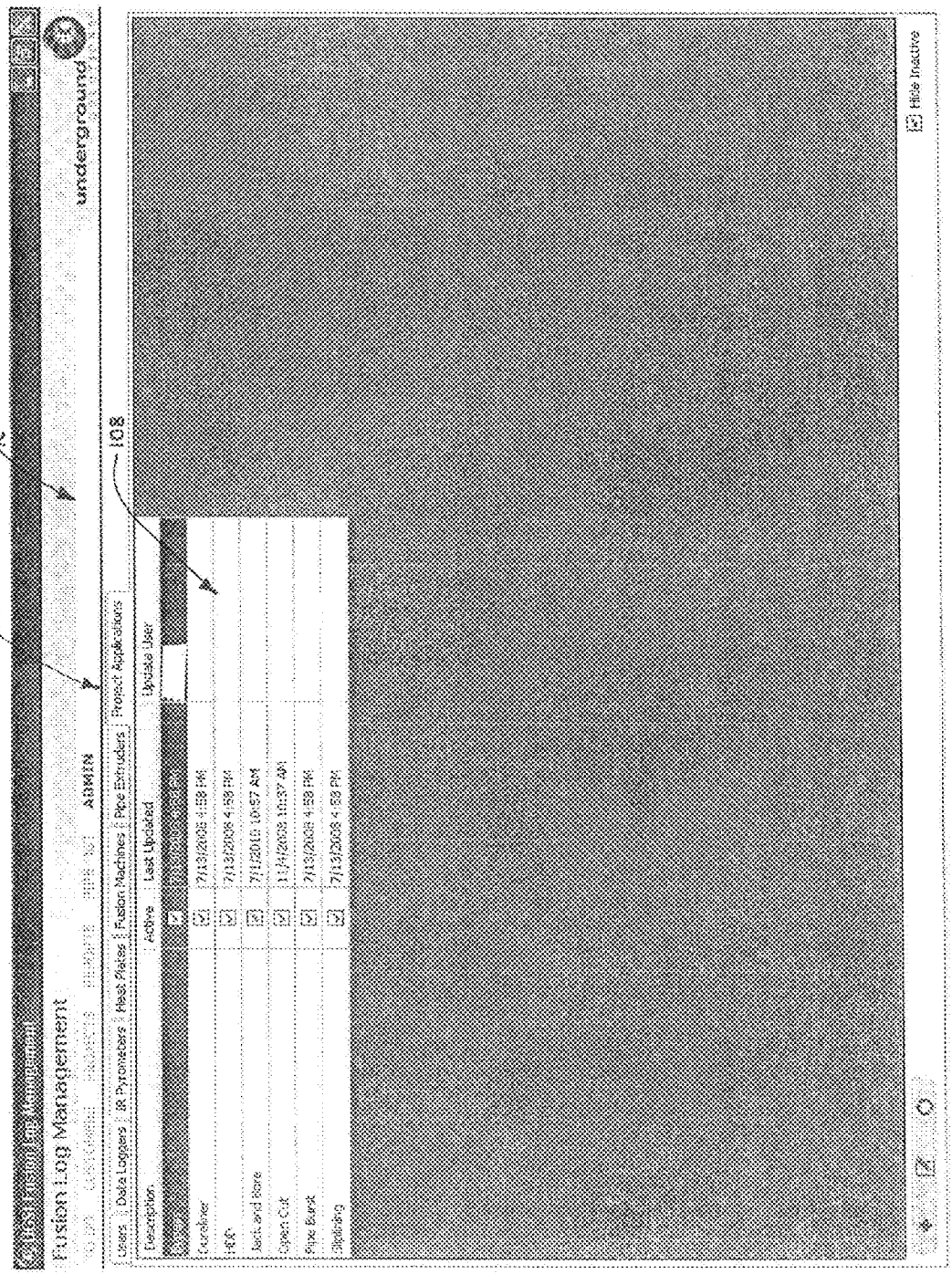
Figure 42:
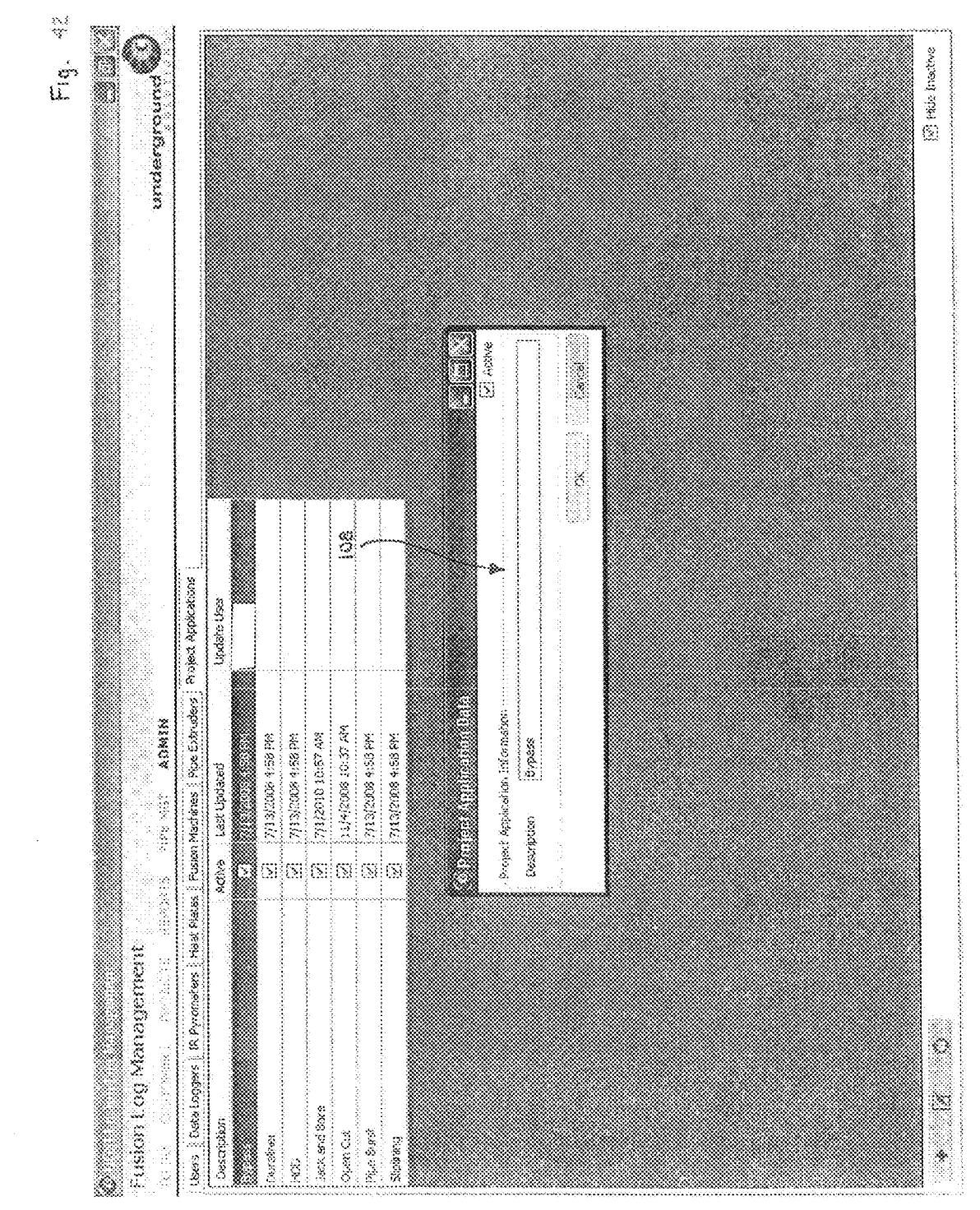

FIG. 39 illustrates the pipe extruder data 106 in the specified portion of the administration interface 36 navigable through the use of the appropriate tab 94. This pipe extrusion data, which is sortable, includes description, activity data, update data, and update user. By selecting at least one of the items, an interactive interface is generated as shown in FIG. 40, where the user U may modify the description or activity data related to the pipe extruder. FIG. 41 represents the project application data 108, which can be sorted and displays the description, activity data, update data, and update user. By selecting at least one of the items, the user U is provided with the interactive interface of FIG. 42, which allows for the modification of the description and the activity data.

In this manner, the present invention provides a comprehensive system and method for effectively managing, tracking, and maintaining multiple (and normally consecutive) pipe fusion (or joining) processes. Accordingly, the pipe fusion data management system 10 allows for and facilitates the collection, storage, processing, and/or analysis of a large amount of data and other information pertaining to the fusion and/or installation of pipe in a variety of applications. Through the collection, analysis, and determinations made using the presently-invented system 10, appropriate tracking and control will lead to fast and efficient identification of any issues in the field, and allow for the appropriate maintenance of the associated equipment. Further, and based upon the level or category of user, the system 10 can provide the appropriate information to the specified user U or group of users U. While it is envisioned that only certain users U will have the ability to manipulate data, the security levels and rights of each user U can be set or altered by an administrator. Accordingly, the system 10 represents an innovative data management system that leads to a safer and repeatable successful fusion process.

It is further envisioned that the system 10 of the present invention can be used in conjunction with or otherwise interface directly with any of the components of the pipe fusion arrangement PFA or fusion apparatus FA. In some embodiments, the system 10 can be configured to provide for the remote control of some or all of the components of the pipe fusion arrangement PFA or fusion apparatus FA, which would lead to faster response times in the event of any issues that may arise in the field. Even without such remote control, the timely provision of data to the technician T may allow any required corrective measures to be undertaken as quickly as possible. Therefore, the pipe fusion data management system 10 of the present invention is a unique and innovative method and system for collecting, analyzing, and supporting further activities related to the pipe fusion (or joining) process.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of preparing a pipe for installation using fusible pipe sections joined together, the method comprising:
    engaging an end face of a first of the pipe sections with a heat plate to heat the end face to a fusion temperature, said step of engaging being carried out at a fusion location;
    collecting temperature data from the heat plate;
    collecting pressure data;
    pressing the end face of a first pipe section against a second of the pipe sections to fuse the first and second pipe sections together and form a fusion joint between the first and second pipe sections;
    placing the collected temperature and pressure data into a report;
    transmitting the report to a location remote from the fusion location;
    analyzing the temperature data and pressure data at the remote location to determine whether the fusion joint is accepted or rejected; and
    communicating back to a technician at the fusion location a determination of the fusion joint being rejected prior to installation of the fused together first and second pipe sections into a service application.

2. A method of preparing a pipe for installation as set forth in claim 1 wherein the step of collecting temperature data from the heat plate comprises collecting a temperature reading from each of a plurality of spaced apart locations on the heat plate.

3. A method of preparing a pipe for installation as set forth in claim 2 wherein the step of placing the collected temperature and pressure data into the report comprises locating an indication of each of the temperature readings on a plate diagram in the report in a location representative of the respective location of the temperature reading on the heat plate.

4. A method of preparing a pipe for installation as set forth in claim 1 further comprising taking corrective action at the fusion joint between the first and second pipe sections in response to said communicating back of said determination of the fusion joint being rejected.

5. A method of preparing a pipe for installation as set forth in claim 1 wherein the step of collecting temperature data comprises measuring said temperature data using a pyrometer.

6. A method of preparing a pipe for installation as set forth in claim 5 further comprising placing pyrometer data representative of said pyrometer into the report.

7. A method of preparing a pipe for installation as set forth in claim 1 wherein the step of collecting pressure data comprises collecting at least one of a drag pressure, a heat pressure, and a fusion pressure.

8. A method of preparing a pipe for installation as set forth in claim 7 wherein the step of collecting pressure data comprises collecting each of the drag pressure, the heat pressure, and the fusion pressure and the step of placing the collected pressure data into the report comprises placing each of the drag pressure, the heat pressure, and the fusion pressure into the report.

* * * * *